(12) United States Patent
Davis et al.

(10) Patent No.: US 10,356,274 B2
(45) Date of Patent: *Jul. 16, 2019

(54) METHODS AND ARRANGEMENTS RELATING TO SIGNAL RICH ART

(71) Applicant: Digimarc Corporation, Beaverton, OR (US)

(72) Inventors: Bruce L. Davis, Lake Oswego, OR (US); Donald Haaga, Portland, OR (US); Alastair M. Reed, Lake Oswego, OR (US); Tony F. Rodriguez, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/425,573

(22) Filed: Feb. 6, 2017

(65) Prior Publication Data

US 2017/0214820 A1     Jul. 27, 2017

Related U.S. Application Data

(63) Continuation of application No. 13/007,372, filed on Jan. 14, 2011, now Pat. No. 9,563,970.

(Continued)

(51) Int. Cl.
*G06F 17/00* (2019.01)
*H04N 1/32* (2006.01)
(Continued)

(52) U.S. Cl.
CPC ......... *H04N 1/32149* (2013.01); *G06F 17/50* (2013.01); *G06F 21/64* (2013.01);
(Continued)

(58) Field of Classification Search
CPC ...... G06F 21/64; H04N 1/32149; G06T 11/40
(Continued)

(56) References Cited

U.S. PATENT DOCUMENTS 5,862,260 A    1/1999 Rhoads
5,949,055 A    9/1999 Fleet et al.
(Continued)

FOREIGN PATENT DOCUMENTS

JP     2002268938    9/2002
JP     2003298831   10/2003
WO     WO2011088386  7/2011

OTHER PUBLICATIONS

Prosecution excerpts (translated) from corresponding Chinese application 201180013636.4 (based on PCT WO11088386), including originally-filed (PCT) claims, First Action dated Dec. 3, 2014, Amended Claims filed om response, Second Action dated May 7, 2015, Amended claims filed in response, and Notice of Allowance dated Oct. 28, 2015.

(Continued)

*Primary Examiner* — Stephen S Hong
*Assistant Examiner* — Matthew J Ludwig
(74) *Attorney, Agent, or Firm* — Digimarc Corporation

(57) ABSTRACT

Art can be infused with network identifiers at the time of its creation, rather than as a post-process. The identifiers may be encoded as overt elements of the art, and enable the artist to reprogram—as over time—an augmentation of the artwork experience via network-delivered components. These network components can include stimuli present when the artist created the work (e.g., music), commentary by the artist, video and augmented reality features, audience-crowdsourced content (e.g., imagery of, or feedback provided by, other viewers encountering the artwork), etc. The artwork augmentation can vary with the user's context (e.g., (Continued)

location, demographics, interests, history). Physical brushes can be equipped to insert such identifiers in graphic arts; other authoring tools are disclosed as well. The network experience can be delivered via smartphones, projectors, and other devices. A great number of other features and arrangements are also detailed.

34 Claims, 9 Drawing Sheets

Related U.S. Application Data

(60) Provisional application No. 61/295,647, filed on Jan. 15, 2010, provisional application No. 61/299,270, filed on Jan. 28, 2010, provisional application No. 61/303,633, filed on Feb. 11, 2010, provisional application No. 61/424,564, filed on Dec. 17, 2010.

(51) Int. Cl.
| | |
|---|---|
| *G06T 11/00* | (2006.01) |
| *G06F 17/50* | (2006.01) |
| *G06F 21/64* | (2013.01) |
| *G06T 11/40* | (2006.01) |
| *G06T 11/60* | (2006.01) |
| *G06T 11/80* | (2006.01) |

(52) U.S. Cl.
CPC .............. *G06T 11/00* (2013.01); *G06T 11/40* (2013.01); *G06T 11/60* (2013.01); *G06T 11/80* (2013.01); *G06F 2221/2119* (2013.01); *G06F 2221/2151* (2013.01)

(58) Field of Classification Search
USPC ........ 715/201, 204, 208, 230, 255; 382/100, 382/232, 233, 235
See application file for complete search history.

(56) References Cited

U.S. PATENT DOCUMENTS

| | | |
|---|---|---|
| 6,345,104 B1 | 2/2002 | Rhoads |
| 6,351,815 B1 | 2/2002 | Adams |
| 6,449,377 B1 | 9/2002 | Rhoads |
| 6,484,148 B1 | 11/2002 | Boyd |
| 6,590,996 B1 | 7/2003 | Reed et al. |
| 6,606,105 B1 | 8/2003 | Quartetti |
| 6,694,041 B1 | 2/2004 | Brunk |
| 6,760,463 B2 | 7/2004 | Rhoads |
| 6,947,571 B1 | 9/2005 | Rhoads et al. |
| 6,975,746 B2 | 12/2005 | Davis et al. |
| 7,003,731 B1 | 2/2006 | Rhoads |
| 7,043,048 B1 | 5/2006 | Ellingson |
| 7,047,412 B2 | 5/2006 | Echizen et al. |
| 7,206,820 B1 | 4/2007 | Rhoads et al. |
| 7,286,684 B2 | 10/2007 | Rhoads et al. |
| 7,587,601 B2 | 9/2009 | Levy et al. |
| 7,697,716 B2 | 4/2010 | Miller et al. |
| 7,796,826 B2 | 9/2010 | Rhoads et al. |
| 7,877,327 B2 | 1/2011 | Gwiazda et al. |
| 8,005,831 B2 | 8/2011 | Hull et al. |
| 8,023,691 B2 | 9/2011 | Rodriguez et al. |
| 8,077,911 B2 | 12/2011 | Brunk et al. |
| 8,091,025 B2 | 1/2012 | Ramos et al. |
| 8,225,099 B2 | 7/2012 | Moskowitz et al. |
| 8,312,168 B2 | 11/2012 | Rhoads et al. |
| 8,385,589 B2 | 2/2013 | Erol et al. |
| 8,610,744 B2 | 12/2013 | Harris |
| 8,805,689 B2 | 8/2014 | Ramaswamy et al. |
| 8,825,682 B2 | 9/2014 | Kishi et al. |
| 9,563,970 B2 * | 2/2017 | Davis ................. G06T 11/00 |
| 9,697,578 B2 * | 7/2017 | Gurijala ................. G06T 1/0028 |
| 2002/0002504 A1 * | 1/2002 | Engel ................. G06Q 10/0637 705/7.36 |
| 2002/0007403 A1 * | 1/2002 | Echizen ............... G06Q 20/401 709/217 |
| 2002/0033844 A1 | 3/2002 | Levy et al. |
| 2003/0110384 A1 | 6/2003 | Carro |
| 2003/0149879 A1 | 8/2003 | Tian |
| 2006/0133645 A1 | 6/2006 | Rhoads et al. |
| 2006/0262352 A1 | 11/2006 | Erol |
| 2006/0284839 A1 | 12/2006 | Breed et al. |
| 2008/0276089 A1 | 11/2008 | Tian |
| 2008/0300011 A1 | 12/2008 | Rhoads et al. |
| 2009/0138484 A1 | 5/2009 | Ramos et al. |
| 2010/0119108 A1 | 5/2010 | Rhoads |
| 2010/0257252 A1 | 10/2010 | Dougherty |
| 2010/0262501 A1 | 10/2010 | Son |
| 2011/0110555 A1 | 5/2011 | Stach |

OTHER PUBLICATIONS

Prosecution excerpts from corresponding European application 11733478.9 (based on PCT WO11088386), including claims presented for examination on Mar. 1, 2013, European Search Report and Opinion dated Dec. 18, 2015, amended claims submitted Jan. 21, 2106, EPO Action dated Jun. 16, 2016, Applicant response with amended claims dated Oct. 3, 2016, EPO Action dated Dec. 12, 2016, Applicant response with amended claims dated Apr. 10, 2017.
Prosecution excerpts (translated) from corresponding Japanese application P2012-549136 (based on PCT WO11088386), including Claims Presented for Examination, First Action dated Jan. 6, 2015, Amended Claims filed Jun. 11, 2015, and Certificate of patent registered Jan. 8, 2016.
Prosecution excerpts (translated) from corresponding Japanese divisional application P2015-251800 (based on PCT WO11088386), including Claims Presented for Examination, First Action dated Nov. 22, 2016, Amended claims filed Apr. 17, 2017, and Final rejection dated Jun. 13, 2017.
File excerpts re PCT publication WO11088386: Int'l Preliminary Report on Patentability (dated Jul. 26, 2012), Written Opinion of the Int'l Searching Authority, and Int'l Search Report (dated May 12, 2011).
Takami, Home Page Builder 12 Perfect Mastering, Shuwa System Co., Feb. 1, 2008 (7 pp.).
Prosecution excerpts from corresponding Chinese application 201180013636.4 (based on PCT WO11088386), including originally-filed (PCT) claims, First Action dated Dec. 3, 2014, and Amended Claims filed Jul. 22, 2015.
Prosecution excerpts from corresponding Japanese application P2012-549136 (based on PCT WO11088386), including Claims Presented for Examination, First Action dated Jan. 6, 2015, and Amended Claims filed Jun. 11, 2015.
Barcode Art by Scott Blake, from barcodeart.com web site archived by Web Archive, Jun. 10, 2009.
Wikipedia article—Scott Blake, Sep. 8, 2009.
Lamantia, Inside Out: Interaction Design for Augmented Reality, UXMATTERS, Aug. 17, 2009.
Zhu, et al, Personalized In-Store E-Commerce with the Promopad: an Augmented Reality Shopping Assistant, *Electronic Journal for E-commerce Tools and Applications* 1.3 (2004): 1-19.
Further prosecution excerpts from corresponding European application 11733478.9 (based on PCT WO11088386), including EPO Action dated Oct. 5, 2017, and Applicant response with amended claims dated Jan. 2, 2018.
Further prosecution excerpts (translated) from corresponding Japanese divisional application P2015-251800 (based on PCT WO11088386), including Final Rejection dated May 23, 2017, Applicant's amended claims submitted in response to Final Rejection, and Reexamination Report dated Oct. 13, 2017.

\* cited by examiner

METHODS AND ARRANGEMENTS RELATING TO SIGNAL RICH ART

RELATED APPLICATION DATA

This application is a continuation of application Ser. No. 13/007,372, filed Jan. 14, 2011 (now U.S. Pat. No. 9,563,970), which claims priority from provisional applications 61/295,647, filed Jan. 15, 2010; 61/299,270, filed Jan. 28, 2010; 61/303,633, filed Feb. 11, 2010; and 61/424,564, filed Dec. 17, 2010.

FIELD OF TECHNOLOGY

The present specification concerns technologies that aid in the creation and utilization of signal rich art ("SRA")—art having a network dimension.

BACKGROUND

Artwork tends to be an abstraction of artistic vision applied to fantasy or reality, frozen in a moment. Think of a painting, or song, or movie. The present technologies concern tools for artists and creative professionals allowing creation and delivery of more holistic experiences to audiences, across multiple dimensions including time, space, media, materials, and senses. Through these tools, art will become less discrete, and more continuous, engaging, and collaborative.

Crude notions akin to certain aspects of the present technology have been presaged to some extent by posters and magazine ads employing barcodes, digital watermarks, or image recognition technologies to link to websites, including Digimarc's work detailed in U.S. Pat. Nos. 6,947,571, 7,003,731 and 7,206,820. FIGS. 1A and 1B show some examples of other artwork employing signaling technologies (barcodes). However, such works are not understood to be created with the tools detailed herein, or have the later-described attributes.

Other related work is detailed in Digimarc's application Ser. No. 12/271,772, filed Nov. 14, 2008 (published as 20100119208); 61/157,153, filed Mar. 3, 2009; and Ser. No. 12/490,980, filed Jun. 24, 2009 (published as 20100205628). However, those applications focus more on detection of signals from television content, and related applications. The present application, in contrast, more concerns tools used in creating content.

As a programming expedient, some graphics software may assign internal identifiers to different elements of an artwork (e.g., layers, and possibly even individual brush strokes). However, such identifiers are understood to be for use by the software only in connection with its own operations; such identifiers are not accessible, e.g., for augmenting the experience of audiences via digital devices and networks.

Certain embodiments of the present technology can be used to encode digital signals into artwork to create a network dimension that may be applied to all major forms of artistic expression, including graphic arts, music, songs, multi-media, etc. Through use of these tools, digital signals become a novel addition to the artist's palette. These signals can add significant aesthetic and commercial value to conventional works of art. For convenience, the detailed description focuses on graphic arts.

The foregoing and other features and advantages of the present technology will be more readily apparent from the following detailed description, which proceeds with reference to the accompanying drawings.

DESCRIPTION

In accordance with one aspect of the present technology, a content authoring system—such as a computer system running Adobe's Photoshop CS4 Extended software—is modified to enable inclusion of network attributes with art, at the time the artwork is created by the user.

Figure 1A:
FIGS. 1A and 1B show prior art barcodes stylized as art.
Figure 1B:
Figure 2:
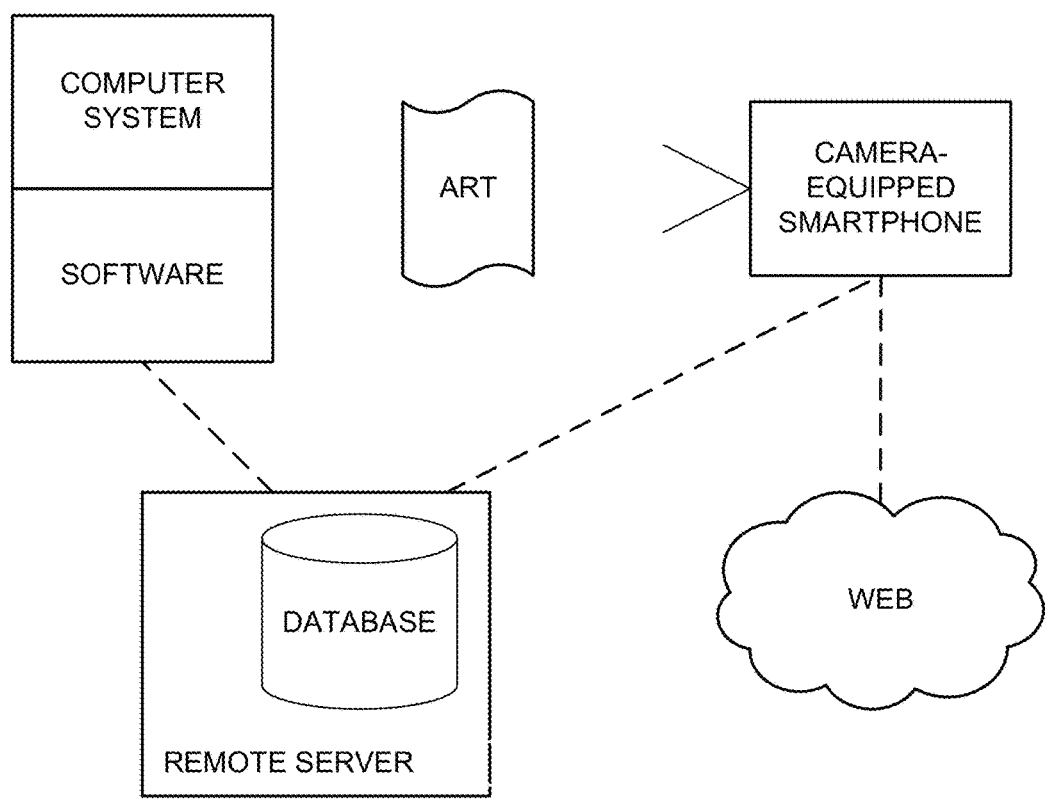
FIG. 2 is a block diagram showing certain aspects of one embodiment of the present technology.

FIG. 2 gives an overview of one particular arrangement. A computer system executes a graphics software package for authoring artwork. In the authoring process, identifiers are associated with individual elements of the artwork (or the artwork as a whole). A remote server includes a database that associates each different identifier with data indicating one or more corresponding network responses. These responses may be regarded as "applications" that are triggered by user discovery of corresponding features in the artwork.

When artwork produced by such an arrangement (e.g., a product label, or an electronic billboard display) is imaged by a sensor-equipped device (e.g., a smartphone), the identifier is discerned from the artwork. It is then passed to the database, to retrieve the associated response/application information. The device then acts in accordance with the application information, such as by loading a page from the World Wide Web, executing a Java applet, rendering a video, connecting to a social network, initiating an augmented reality experience, etc.

This response application may, for example, electronically link a person viewing the artwork to further information or other content associated with the artwork, e.g., hearing the artist's spoken commentary about the art, or reviewing comments left by previous viewers. A family's Christmas card can have network extensions that, when viewed through a smartphone, cause a video recording of the family expressing their greetings to be rendered. The responsive applications can be varied over time. Responses can also vary based on context, such as geographical location of the art, the viewer's age and language, etc. Commercial opportunities are numerous.

Adding a network attribute to art at the creation process can be analogized to a painter's technological palette—a resource from which the artist can draw in composing an artistic creation. In this case, the artistic creation has one or more network attributes.

Network attributes can be of many forms. Some take the form of identifiers associated with artworks, or components thereof. (The identifier may be a binary number of any length, e.g., 4 bits, 12 bits, 36 bits, 96 bits, 256 bits, etc., or it may be another form of data symbol—not necessarily binary.) The identifier can be associated—in a local or remote data structure (e.g., a database) with related application information, such as a network address for linking, or stored computer code for execution, or a multimedia file for rendering, etc.

One way to convey an identifier with artwork is by use of a paintbrush tool that lays down pixels (or defines a vector graphic) having a patterned or textured arrangement that encodes or otherwise conveys the identifier. The patterning may be so subtle as to be imperceptible to human viewers (e.g., steganography, or digital watermarking), or it can be strong and overt. This latter case includes digital watermarking techniques in which the amplitude of the encoded signal is set to a plainly visible level. It also includes brushes that lay down shapes filled with machine readable symbologies, such as 1D or 2D barcode elements, or data glyphs. For expository convenience, all such signaling techniques are referenced simply as "digital signals."

Such signals can be within borders of a shape laid down by the tool or in an associated effect, such as shadow or 3D elevation.

A given signal can also span several graphical elements, such as digital watermark line width modulation of a set of lines (e.g., in ornamental guilloche patterns), and lines comprising barcodes.

In certain arrangements, artwork employs digital signaling as a desired feature—rather than an attribute to be hidden or obscured. What, in many prior contexts, may have been regarded as undesirable "noise," is instead exploited as an element of artistic creation. Just as art can be formed from assemblages of utilitarian articles, so too can art be formed using expressions of signals as component parts.

Some of Andy Warhol's most memorable works are those in which he emphasized mechanical aspects of graphical arts, such as enlarged halftone dots and spatially separated color screens—bringing to the fore features that normally escape viewers' attention. In like fashion, artisans employing the present technology may use data-rich patterns and textures in dominant roles. (While such abstraction is not common in representational imagery, much artwork is not representational. Consider familiar art forms such as upholstery, rugs, and clothing fabric designs.)

In an exemplary embodiment, the signaling pattern applied by the brush is selected from a palette. The palette may offer different signal forms between which the artist can select by interaction with a graphical or other user interface. A mosaic of signal forms can be employed in a concerted fashion to create complex network attributes.

Figure 3:
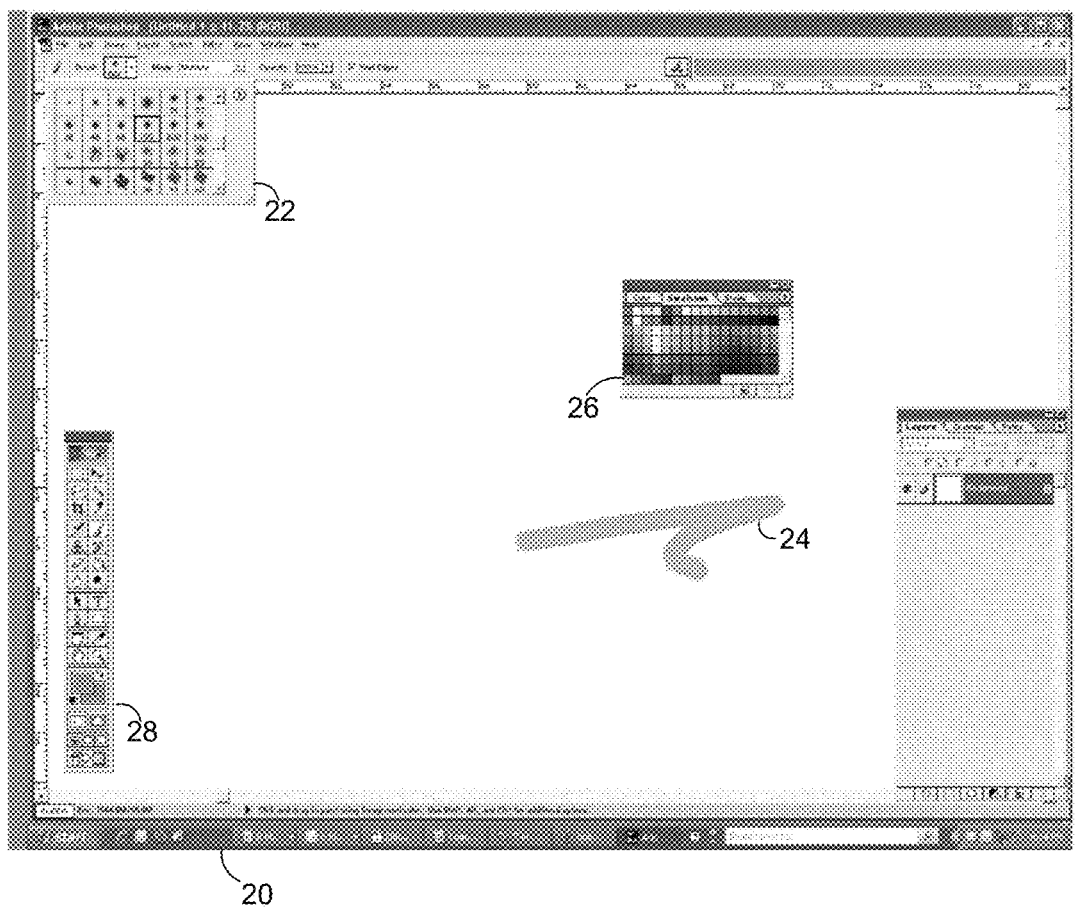
FIG. 3 shows a graphical interface used by Adobe Photoshop, which can be adapted in accordance with aspects of the present technology.

FIG. 3 shows an illustrative graphical user interface 20. Included is a dialog box 22 from which the user can select brushes to lay down graphical elements, such as brush stroke 24. Also shown is a palette 26. Among the different effects (e.g., colors, textures) selectable from the palette 26 are effects that additionally convey plural-bit identifiers.

Figure 3A:
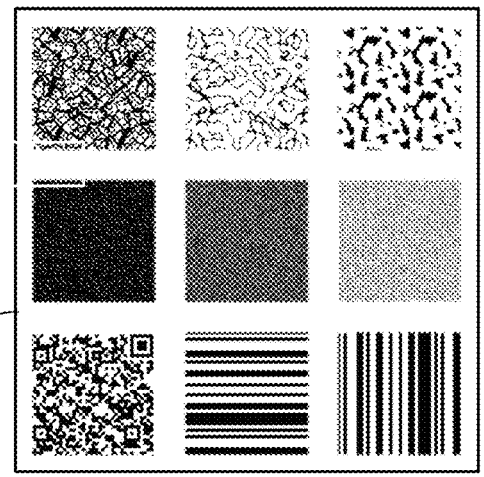
FIG. 3A shows an excerpt of a palette control used in the FIG. 3 UI.

FIG. 3A is an excerpt of a palette control, from which the artist can select different effects to be laid onto the canvas. Some are signal-conveying; others are not. In one particular arrangement, each time the artist dips a brush in a new signal-conveying palette box, a new layer is automatically added to the artwork, on which the new signal is applied. The artist contemporaneously or later associates the signal with metadata and applications, such as by a campaign manager dashboard. The campaign manager enables the artist or her associates to program the experience of the audience and the feedback mechanisms triggered by the focal artistic embodiment (e.g. photo, ad, video, song).

Figure 3B:
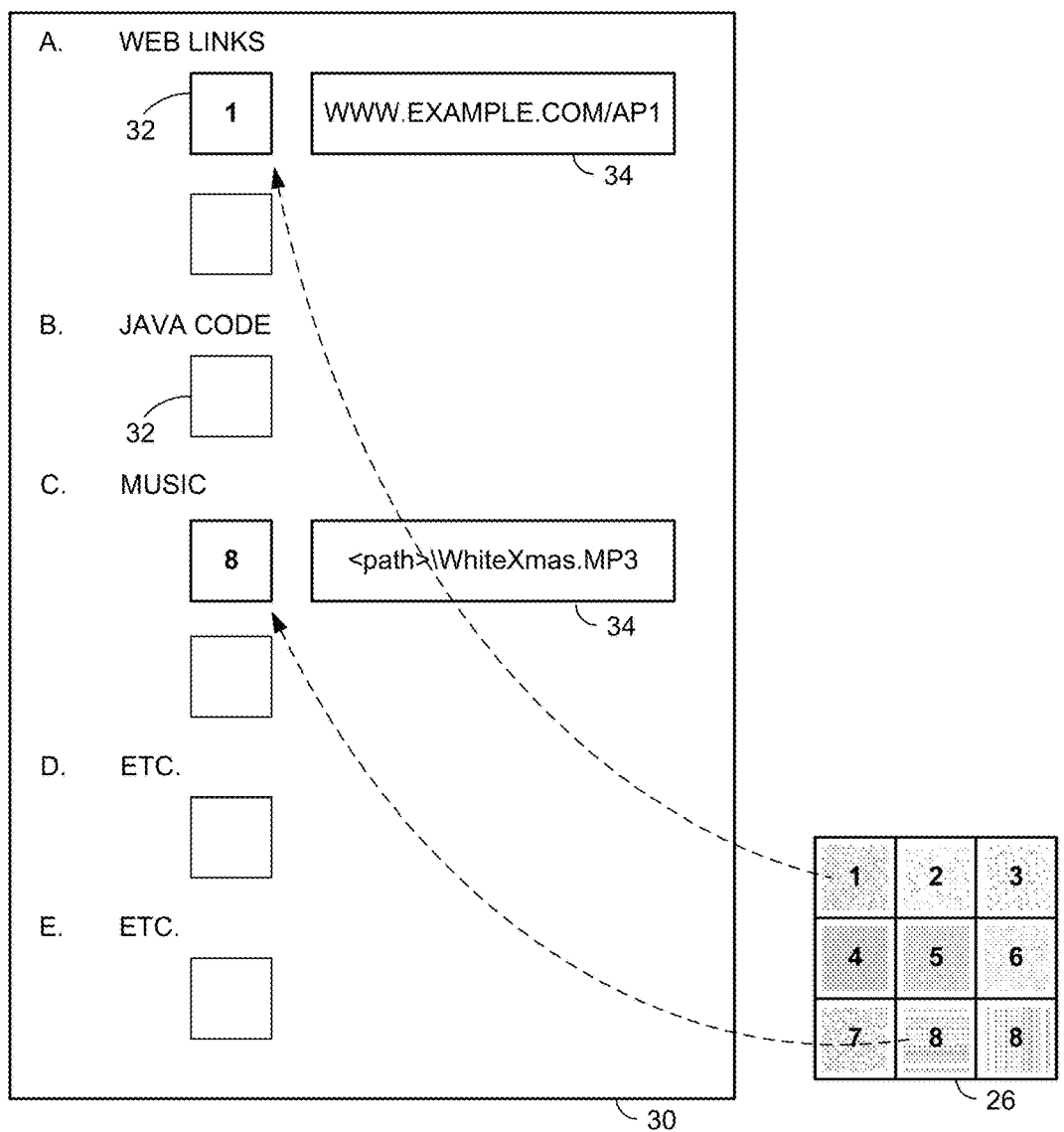
FIG. 3B shows details of an exemplary user interface by which different palette signals can be associated with different response data.
Figure 3C:
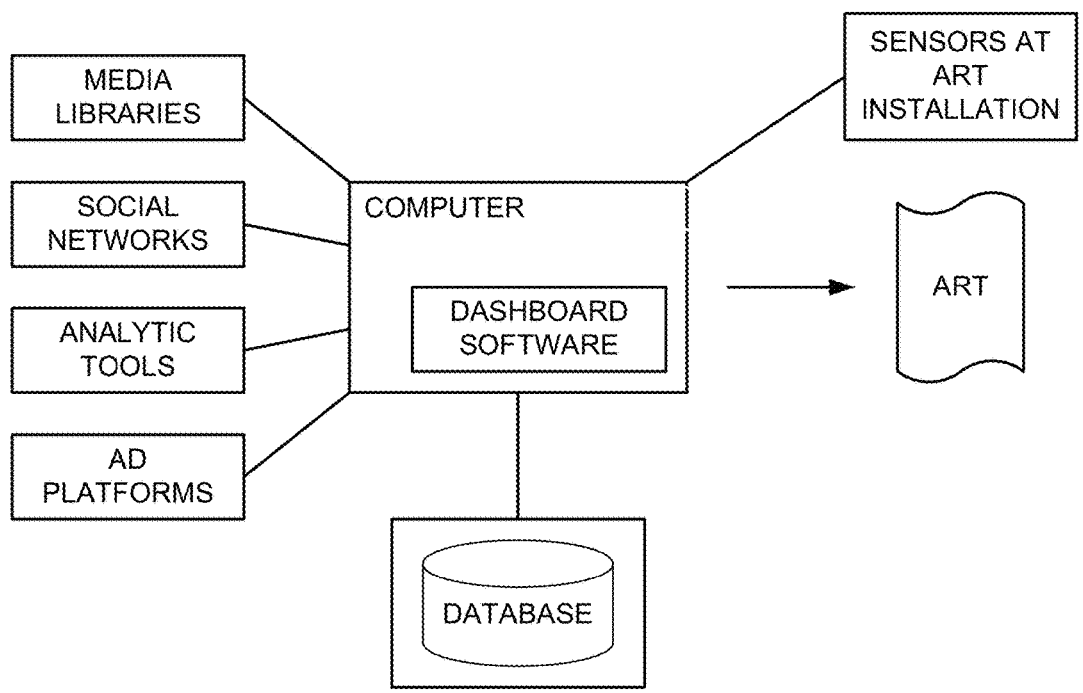
FIG. 3C shows a portion of a system employing dashboard software.

The campaign manager dashboard can be modeled after other software control dashboards, such as are used to manage marketing or web video campaigns. An illustrative dashboard may include user interface controls by which the operator can perform tasks associated with: (1) content production; (2) distribution (publishing); (3) engaging the user with features that invite user involvement; (4) analysis; and (5) monetization. FIG. 3C shows a portion of such a system.

Controls associated with producing the content allow the operator to craft the work and program the audience experience (e.g., drawing from different content sources, and employing various applications and feedback mechanisms), as well as manage same (e.g., adding and editing metadata, etc.).

The content production controls can provide, or access, libraries of component works, including music and videos. These may be accessed not just by bibliographic details, but also by genre, keywords, recommender systems, etc. For example, an artist working on a print ad for boots may input keywords (e.g., by typing, speech recognition, etc.) that describe or relate to the subject and its targeted audience. The dashboard may query external resources and libraries, and make suggestions about (and provide links to) soundtracks and other content that might be suitable for association with the artwork (e.g., songs such as "These Boots are Made for Walkin" by Johnny Cash/Nancy Sinatra/Jessica Simpson/Geri Halliwell/Jewel/Megadeth; and "Boots On" by Randy Houser; stylized patterns of boot treads; archival WWII movie footage showing muddy boots; etc.). In like fashion, some music recommendation engines work on descriptors such as "edgy," "dangerous," "outdoors," etc., and suggest music tracks that connote the indicated attributes. Certain initial suggestions may be provided to a recommendation engine (e.g., Apple's Genius technology) to identify still further content that may also be suitable. Content production tools providing such functionality thus extend the artist's creative process, and can enhance the resulting work.

Distribution controls allow the artist, or agent, to configure delivery (e.g., across various channels and to various platforms), and also to tailor times and context in which the context is to be presented.

User engagement controls enable the operator to employ a variety of technologies—often based on social networks—to involve the audience with the content, such as inviting user feedback (e.g., uploading user generated content, chat, comments, ratings, blogging, etc.) and facilitating user participation in other contexts (e.g., Twitter, RSS feeds, SMS notifications). Just as the artist may complement a visual artwork with a congruent soundtrack, so too may the artist complement the artwork with one or more social networking features that are conceived to complement the work.

Some dashboards may include extensive analytic functionality. These can include spreadsheet and charting options that allow analysis of content distribution by time/location/channel/etc., audience demographics, length of viewer engagement, click-through statistics for different commercial and non-commercial links, etc. etc.

The monetization aspects of the dashboard typically involve integration with different ad platforms and formats (e.g., Google, DoubleClick), commercial sponsorships, e-commerce activities, etc.

In some respects, use of such as system is akin to production of a motion picture. In motion picture production, individual scenes of a movie may initially be captured in front of a blue screen. Later, in post-production, digital artwork is substituted for the blue background, sound effects are added, and computer graphics effects are inserted and integrated. These individual scenes are then stitched together with certain transition effects, etc. In like fashion, an operator of the illustrated system assembles an artistic production in stages—first creating elemental parts of the work, and then defining and adding further aspects of the work using the various controls and options provided by the software tools. (In many cases, the elemental parts include signal attributes with which respective applications are later associated.)

One artist may use the dashboard to tailor a work so that different responses are triggered, depending on which model of cell phone a viewer is using. Another artist may tailor a work to respond differently based on the age or gender of the viewer, etc., etc.

One artist may specify Amazon as a destination for interactions; another may specify Ebay.

One artist may use the dashboard to establish a FaceBook page associated with the work; another may use the same dashboard but instead associate the work with a MySpace page.

One artist may use the dashboard to associate the artwork with tracking services provided by Omniture (Adobe); another may use the dashboard to select DoubleClick (Google). Through the dashboard the artist may select a free package of analytics, or a $500 package. Etc., etc. After the artist has configured the work in the desired fashion, she may send the associated data (e.g., a file defining a print ad) to a magazine for inclusion in the next issue. When audience members interact with the print ad using their cell phones, tracking/analytic data is then received back (by the artist or other designee) from the earlier-identified service provider, in accordance with the earlier-selected package of services. Etc.

Thus, through implementations of the present technology, an artist can knit together a creative aesthetic that transcends the traditional notion of an artwork as being a singular object in time and space, and shifts the conception of an artwork to being a digitally orchestrated network of complementary features, senses, and social experiences.

In some arrangements, the artist can associate digital signals with metadata and applications using functionality built into a suitably-equipped version of Photoshop-like software. For example, the user interface (of which the palette 26 of FIG. 3A may be a part) can include a control 30 for associating different digital signals represented in the palette with different applications. For example, as shown by the dashed arrows in FIG. 3B, the interface may allow the user to paint pattern from the palette into boxes 32 associated with different types of applications, e.g., web links, Java code, music, etc. When one of the boxes is painted with a palette pattern, a further input control 34 appears, in which the artist types details of the desired application to be associated with that pattern (e.g., by web address, MP3 name, executable software identifier, etc.).

Each time one of the boxes 32 is painted, a further box appears under the same category, allowing the user to define multiple signal associations of each type, if desired.

In one viewing mode, the authoring software overlays textual annotations (e.g., A1, C1, etc.) on regions of artwork that have been painted with different digital signals, to allow the artist to readily identify the application associated with each region.

In one embodiment, the particular numeric (or alphanumeric) identifier conveyed by a graphical pattern is assigned by the software, in an automated fashion (e.g., sequentially through a predefined numbering space, randomly, etc.). However, another graphical user interface allows the user, if desired, to enter a particular identifier that the pattern is to convey.

In another embodiment, when the user selects an information-conveying effect from a palette, a dialog box appears requesting the desired identifier. The user can type-in the identifier, in hex, decimal or otherwise, or can specify the identifier by manipulating a graphical control, such as a slider bar. If the user hits Enter without entering an identifier, the system assigns one on its own.

In yet another embodiment, the user correlates the identifier with certain metadata, contemplating triggering of services associated with the metadata when the identifier is recognized by a digital device sensor.

Many image file formats (including most of those supported by Adobe Photoshop) store metadata in association with the artwork. Much of the metadata is produced by the software during the authoring process, and is stored without involvement of the user. This data can relate to the artwork (e.g., canvas size), the artist (e.g., biographical details), the circumstances of artwork creation (e.g., dates and times worked on; location where created), etc. The metadata storage can be used for storing information associated with the present technology. In some embodiments, it may be the source from which the external database mirrors relevant information.

The metadata produced by the software can be incorporated into the definition, or characterization, of audience augmentation/response. For example, when a viewer encounters a print advertisement, localization data matched with contextual data can shape the targeted response. The response can further depend on other metadata associated with the artwork. Moreover, audience responses to artwork, or to applications triggered by interaction with the artwork, may be logged in the storage as further metadata—helping shape interactions with future audiences.

Brushes are not the only tool that can be used to apply signal-rich effects to artwork. Essentially any tool offered by the program can be so-employed (several others are shown in control 28). For example, a gradient fill tool can be used to apply a signaling pattern to a particular layer or region of the artwork.

Moreover, the tools needn't additively combine signal to image elements. The encoding can also be effected by subtracting an encoding pattern from another element, region or layer. The encoding can also be effected by changing the mode of the artwork, such as by choosing a bit-mapped representation using a dither that conveys a data payload (glyphs are one example). A half tone or other screen effect can likewise impart a digital signal.

In still other cases, the program can algorithmically change an object depiction in subtle respects to represent data. Consider a face. Dimensional statics for human faces are well categorized (e.g., for use in facial recognition applications). Typical distances between pupils, between mouth corners, eye midline-to-nose, etc., and ratios therebetween are well understood. On recognizing a face in a drawing or artwork, the program may slightly modulate (adjust) certain of these statistics—akin to snapping vector graphic elements to grid points—in order to represent one of several different plural-symbol payloads.

Reference was earlier made to association between an identifier conveyed by the artwork, and other functionality (e.g., associated in a database). The graphics editing program (e.g., Photoshop or GIMP) can provide a user interface by which this association can be defined and stored, either locally, or in a cloud database.

One such interface is a dialog box that is tabular in form, populated on the left with identifiers used in the artwork, and on the right with blanks in which the user can type, or drag, web links.

In another arrangement, the identifiers are not revealed to the user. Instead, the user simply right-clicks on a layer, brush stroke, or other data-conveying element. The program responds with a dialog box (perhaps after selecting an option from a drop-down menu) inviting the user to define a network resource that is to be associated with the identified element. In response to such user action, the software submits data to a database associating the indicated network resource with an identifier for the element.

In still other arrangements, the palette has paired identifiers and associated network attributes, both pre-existing at the time the palette is used to create a work. For example, the software program can present a palette of audio effects—sounds of nature, Rolling Stones' I Can't Get No Satisfaction, the opening notes of a Beethoven symphony, etc. An artist can touch a brush to the desired palette tile, and then stroke music across different regions of the artwork. (This is typically done in a "layer" distinct from visual elements of the art, simply as a data organization expedient.) When these regions of the artwork are later imaged by a consumer, the selected music is identified through a database lookup, and rendered.

In another particular implementation, the artist listens to music as she composes an artwork, and may elect to have such music associated with the artwork. For example, an MP3 player (hardware or software) can output meta data indicating the song currently playing. This information can be associated with a particular tile in a palette that the artist can select. Or it can be associated with the entire artwork, without resort to tool and palette.

Alternatively, the computer system can include, or make use of, music recognition technology, such as is described in Shazam's U.S. Pat. Nos. 6,990,453 and 7,359,889, and its published patent applications 20050177372 and 20080154401. For example, a microphone coupled to the computer can sample ambient audio in the artist's environment. Fingerprint information is then derived from the sampled audio, and submitted to a fingerprint database to identify the song. This information is then associated with one or more identifiers conveyed by the artistic work. When a viewer encounters the work, the song identification can be retrieved from the artwork, and used to obtain a copy of the song. The song can then be rendered to the viewer while studying the art—allowing the viewer to perceive the art in the audio environment in which it was created.

Figure 4:
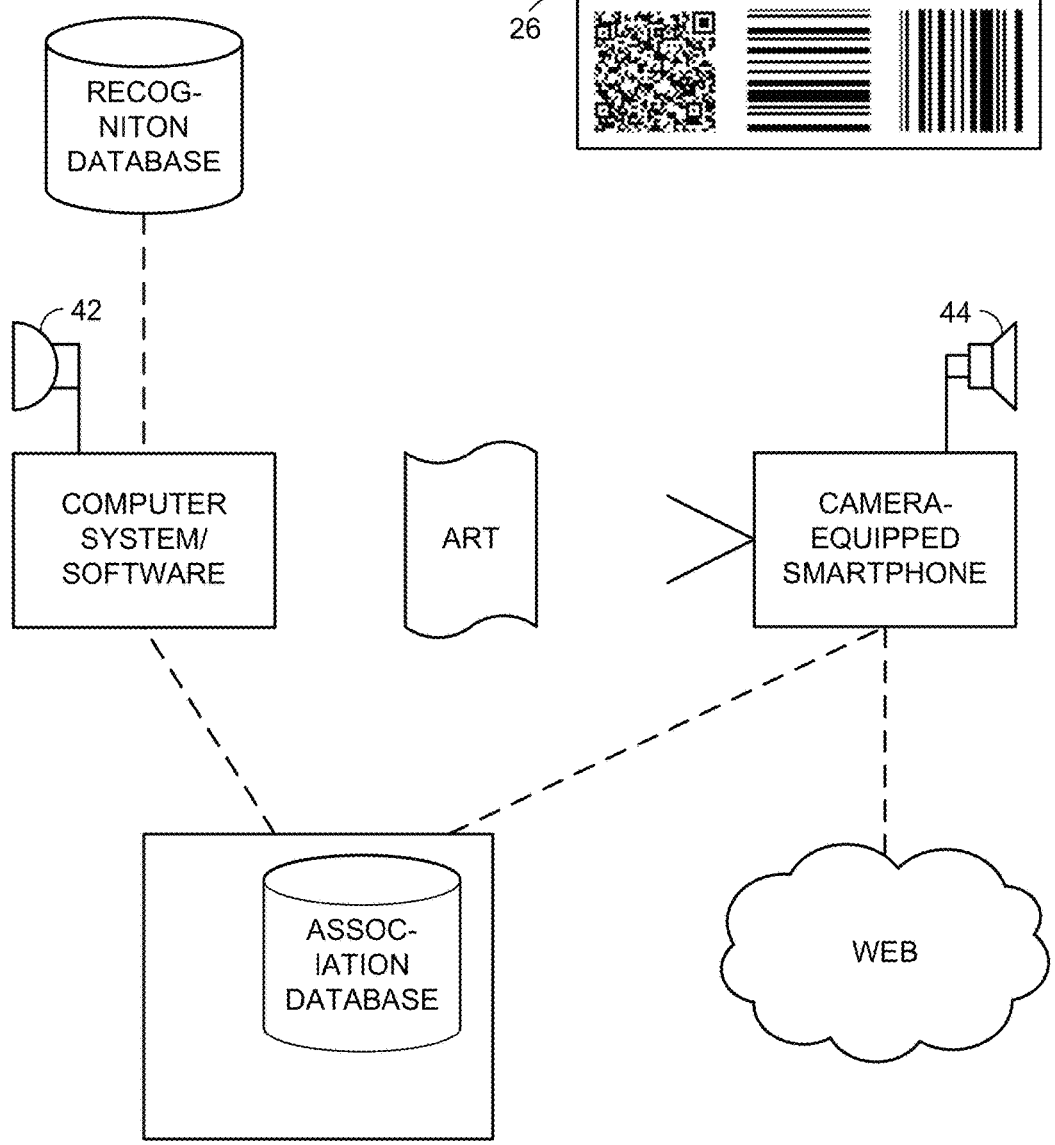
FIG. 4 is a block diagram showing certain aspects of another embodiment of the present technology.

Such an arrangement is shown in FIG. 4, including a microphone 42 coupled to the artist's computer system, and a speaker or other sound transducer 44 associated with the viewer's smartphone.

Just as such an arrangement can allow the viewer to experience the artist's auditory environment, similar principles can allow the viewer to experience other aspects of the artist's creative milieu. For example, the artist's computer system may have a camera that produces still or motion imagery of objects and scenes in the artist's view. (Such a camera may be borne by the artist, e.g., using a head-mounted arrangement.) This image data can be stored in a database, and associated with the art, for later recall by viewing devices. Or, imaged objects and scenes can be recognized using fingerprint, SIFT, and/or other visual recognition techniques—allowing metadata identifying such surroundings to be identified and stored in association with the artwork. Again, a viewer device can extract signals from the art, allowing retrieval of information about the artist's visual environment. Again, renderings of such environmental features can be based on data obtained from the web, or otherwise, and provided to the viewer while experiencing the art Other sensations, such as smell, vibration, touch, etc., derived during the creation process (or otherwise) can likewise be associated with the artist's creative work. For example, haptic devices can be employed by the public to emulate artist movements associated with the work, giving the audience a further dimension of artistic experience.

Moreover, data from and relating to sensors involved in the creation of art can be stored for use in later network associations: the pressure applied to a Wacom stylus, the speed of a stylus stroke, the particular brush used—all of these data can be associated with artwork (the present work, or others). They can serve as APIs or hooks that are grouped and exposed to augment the art. When listening to the Rolling Stones, an artist may use broad brushes with heavy pressure. These attributes can be grouped together and associated with a particular audio experience Because network responses can be associated with different elements of the artwork, a viewer may be provided different experiences by focusing the sensing device (e.g., smartphone) on different regions of the art. Focusing on a mountain depicted in an artwork may evoke sounds of winds screaming around an exposed peak; focusing on a valley in the same piece can summon audio renderings of a brook.

In addition to varying with location, the associations can also vary with time, e.g., tracking the time spent by the artist in creating a work. One example is the artist's auditory environment being rendered for the viewer during a viewing interval. The longer a person views the art, the more the auditory information is rendered.

In some arrangements, the editing software (or other software) is capable of "replaying" a work of art to a viewer through its process of creation—from a blank canvas (screen) to a finished work. That is, the finished artwork file can include not only information about the placement of each artwork element, but also temporal information about the order and timing by which they were applied. Thus, in addition to perceiving the finished work, a viewer can also use a viewing device (and perhaps others) to explore the process by which the artwork was created. The various network associations can then be rendered with temporal ordering and intervals corresponding to the timing by which the artwork was created. (A time warp control, such as a shuttle, may be provided in the rendering UI, to allow the viewer to experience the creative process at an accelerated rate, so that an artistic process that took hours or days can be rendered in minutes or seconds.)

In some arrangements, the artwork file (e.g., an Adobe *.PSD file) can include stored timecode references—a clock with which different parts of the creative process are timed. Just as network actions can be associated with visual elements of an artwork, they can likewise be associated with timepoints in the chronology of the artwork's creation.

For example, a person studying an artwork for ten minutes may be provided a comment, or audio clip, associated with the tenth minute of the work's creation. (Again, with a time warp control, the network extension associated with a ten minute timecode can be activated, e.g., after one minute of viewing.) The artist can also associate network features of art with desired timepoints—regardless of timing of the creation process.

Figure 5:
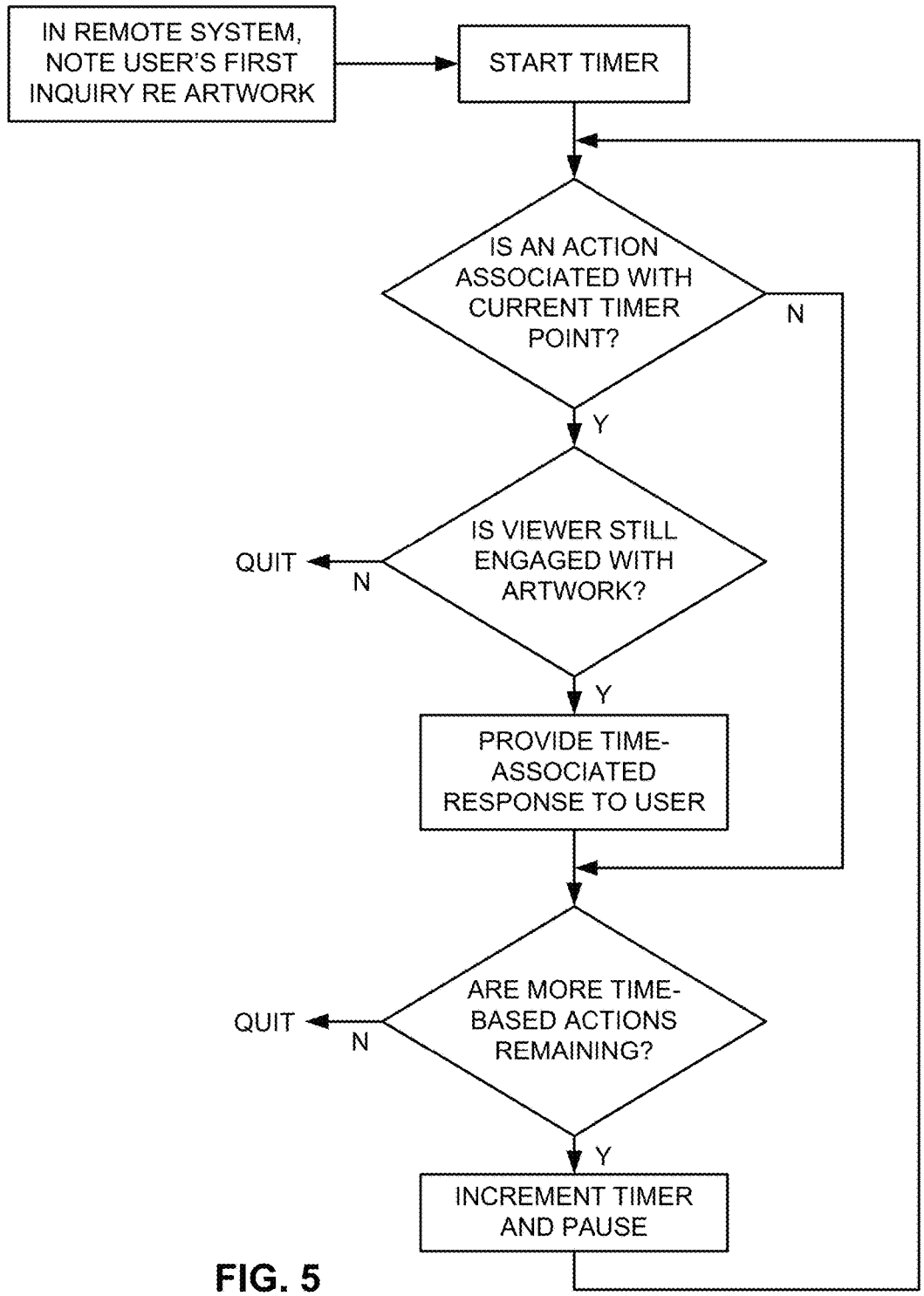
FIG. 5 is a flow chart showing certain aspects of one embodiment.

One way to implement such visual feature-independent timecode associations is shown in FIG. 5. The remote system that resolves network associations for the artwork starts a timer when a user's smartphone first engages with an artwork (e.g., by decoding a signal embedded in the artwork, and sending it for network resolution). The remote system then loops—checking to see if there is any action associated in the database with the current timer count. If there is an association (e.g., a sound clip is to be rendered, or a word is to be presented), the system next checks whether the user is still engaged with that artwork.

User engagement can be tested in various fashions. For example, if the smartphone publishes its location (e.g., data from a GPS receiver module) in a manner accessible to the remote system, then movement of the user away from the artwork's vicinity (e.g., the location from which the first engagement was sensed) can indicate disengagement. Another test is whether the same smartphone has engaged with a different piece of art through the remote system, in which case disengagement with the former artwork is then indicated. Still another test is whether the smartphone has recently (e.g., in the past 15 second seconds) discerned and sent a further identifier associated with the artwork to the remote system for resolution. If so, this indicates the user is still engaged.

If the user is still engaged, the remote system then acts on the time-associated response, such as by providing a link or content to the user, or performing other action.

The process next checks whether there are further time-based actions yet to be acted on for that user. If not, the process terminates. Otherwise, the timer is incremented and the loop repeats. (The timer increment can be set to suit the needs of a particular application. For some, a granularity of one second may be appropriate; for others, one minute may be better. This is indicated by the programmed "Pause" in FIG. 5.)

In some cases, a network response may have its own programmed temporal aspects. For example, a Flash presentation may include its own scripting timeline. Once this response is initiated, it may play out automatically in accordance with its programmed sequence. Such a presentation can include still imagery, audio, video, etc. In such cases, the remote system needn't orchestrate the timing of responses; once the Flash sequence is initiated, it controls the time-based actions.

It will be recognized that an arrangement like that just-described, and illustrated in FIG. 5, can likewise be effected on the user's smartphone (the "client" side). That is, when the phone first engages with an artwork, it can download information about all of the time-related responses from the remote server. A phone timer can then indicate timepoints at which certain time-related actions should be taken, and trigger same.

Audience members may also take away snippets from the experience, such as a ringtone, an image (e.g., for desktop wallpaper), a coupon, an RSS feed, etc., so as to let the experience live on with the audience after the initial "performance." In some circumstances, the user's smart phone is the medium by which such snippet is conveyed from the artistic encounter. In other circumstances, other means of delivery can be employed. The responsive application can bookmark a web site to which only individuals that have encountered the artwork are granted access (e.g., by a URL and associated key that are transferred to the phone).

Database associations between artwork elements and network responses needn't be defined at the time the art is created. These associations can be defined later—either using the original artwork creation tool, or another database editor. Similarly, associations once-made needn't be maintained. They can be later changed—usually by the artist, but also in some instances by viewers.

Some artists may be frustrated that the public doesn't "get" their work. After a work has been published without the understanding or acclaim the artist desires, she can associate further information with the work—explaining its significance, imagery, etc. New viewers, aided by the artist's commentary linked from the work, may finally "get it."

Some artists may offer different narratives for their work, between which a viewer can select (or the viewer may review all). One narrative may be for school age children, another for adults. One may be for people who express an appreciation for the work, another for those who express a distaste for it. Etc. The artist's associated information needn't be auditory; it can comprise images or words calculated to trigger new insight into understanding the artwork.

In some instances, aspects of the viewers' experiences are added to the art's network dimensions. For example, an artwork installation, or a commercial electronic signboard, can include a camera system to sense the number of viewers, their genders and approximate ages, and the time they spend viewing the art. (Such arrangements are known; e.g., published patent application WO 2007/120686 discloses electronic billboards equipped with camera systems that sense viewers and estimate their ages and genders.) One of the network features associated with an artwork can be the demographics, and time, that others have spent viewing the art. In an augmented reality (AR) smartphone viewer, for example, the AR software can identify the artwork by signals it conveys, look up a corresponding network resource that includes viewer demographics, and then present to the user a bar graph overlay showing the cumulative time spent by people of different demographic groups viewing the art. A new viewer can scan an artwork gallery, and quickly identify the works that have commanded the most, and least, attention—optionally broken down demographically. (Ditto billboards and electronic displays in subway stations, etc.)

More than just statistics can be collected and rendered in this manner. With appropriate privacy safeguards or permissions, a camera system that views the viewers can post their images to a network resource associated with an item of art. A viewer of the artwork can then view previous viewers— the familiar pastime of people-watching, this time through the lens of an artwork of shared interest. (The artist can likewise view an audience that her work attracts.)

Again, augmented reality arrangements can also be employed to vary the visual appearance of the artwork, as viewed by a smartphone or the like. For example, superimposed on the artwork may be silhouettes, or transparent ghost images, of the last ten people who lingered in front of the artwork for more than ten seconds, or the last six children, etc.

Similarly, people can provide feedback, e.g., spoken, by text messaging, or otherwise, responsive to art. (An art installation, such as an electronic display terminal, can include a microphone to sense spoken feedback, or same can be called-in using microphones in users' smartphones. Network links associated with an artwork can present viewers with a destination number to which text messages can be sent, or may provide a web-based UI for viewer text entry.) Artworks may have FaceBook pages, Twitter sites, or other social network presences, through which interactions are channeled. All user feedback, too, can be stored in association with artwork identifiers—available for recall by other viewers, and the artist. The artist, in turn, may take this collected feedback and use it as fodder for the creation of an entirely new work.

A new modernism may emerge, in which the "Expose Yourself to Art" slogan takes on new meanings.

It will be recognized that such conceptions of art take on a social aspect, through which the artist can draw from crowd-sourcing technologies to augment the experience, adding evolutionary aspects to an artwork.

Consider the cult-following of the movie Blade Runner, which has led to creation of the notion—unintended by the movie's creators—that Harrison Ford's character is actually an android. An artwork's viewers may similarly continue and extend the artistic tradition. That is, a community of viewers can respond to, and may contribute to, artwork in unexpected ways—perhaps causing the meaning, relevance or import of the art to evolve over time.

In turn, an artist may reprogram the network appurtenances of an artwork, in a manner akin to a live performance—responding to the audience's responses. As the audience response changes further, the artist's sur-response changes further, etc. An episodic experience can ensue.

Alternatively, the artist may surrender the network content of an artwork to the audience—perhaps sometimes acting as a moderator, perhaps not. Perhaps the artist returns five years later to find the network presence of the artwork wholly different than his original instantiation.

Use of smartphones and other processing devices to mediate and augment interaction with artwork enables further possibilities. One is the concept of Easter eggs— messages or features exposed only after an arcane or unusual set of events.

Some Easter eggs may be associated with obscure features in an artwork, which most viewers will overlook or not network-explore. For example, if a viewer focuses the smartphone on a particular dandelion in a field of depicted dandelions, a surprise response may be revealed. Some such features may not be exposed for years, if ever.

Another artist may feel that until a person has viewed an entire portfolio of associated works (e.g., 20 prints, distributed across several galleries in town), they cannot really understand the artist's message. The artist may arrange to deliver a bonus presentation (e.g., a one-time only rendering of a video showing the artist winking at the viewer) to anyone who views all such works.

Each time a smartphone queries the database, the database can log an identifier of the smartphone (e.g., a device ID, a MAC address, a phone number, etc.), together with information about the record(s) it queries. The database can then determine when a given smartphone has submitted queries relating to all works in a portfolio. When the last query is submitted, the database system can return the Easter egg presentation to the surprised viewer.

By arrangements like the foregoing, an artist can craft or influence the public's experience of artwork, leading to a richer interaction with the artist's motivation or message. Even a static print can become a portal to experiences that can be akin to performance art.

Naturally, such technology has commercial implications as well, extending to advertising, product packaging, video entertainment, etc. Even art galleries dabble in commerce. A gallery may be equipped with cameras, Bluetooth receivers, or other sensors (e.g., video cameras) by which a person's temporal engagement with a particular artwork can be sensed and assessed. Likewise, the person's interactions with the artwork's network extensions can be noted. If a gallery patron spends 45 minutes considering an artwork, or returns to it repeatedly, the gallery may want to follow-up to complete a sale. Network traffic can be data-mined to reveal what patrons are interested in what artists, genres, etc. Follow-up mailings or other targeted marketing efforts can be based on such information.

While described in the context of authoring digital still image artwork, the same arrangements can likewise be applied in composing other media, such as audio, audio-visual works, sculptures and electronic 3D media, etc. Moreover, it will be recognized that still image editing tools also play a role in creation of many other content types, such as painting 3D models and wrapping images around 3D shapes used in film and video, and authoring special effects and animations. Likewise, the tools and techniques disclosed for still image artwork are equally applicable in contexts such as web page design, and authoring network rich documents useful in fields such as engineering, science, architecture and manufacturing.

Education is another field in which the detailed technologies are advantageous. Media that engages individuals to explore and interact with instructional materials fosters a more captivating and effective learning experience than passive teaching aids. Likewise with print media serving other communication roles.

The technologies described herein can be rendered in paintings, sculpture, and other art forms where the use of computer-aided design heretofore has been nominal or not used, by employing emulation. For instance, a robotic arm can apply oil paints by palette knife to a canvas as the artist paints or based on subsequent analysis of the process of the painting or of the artwork itself. A CNC 3D milling machine can create a shaped polymer medium on which paints or inks can thereafter be deposited, mimicking the 3D effects of oil painting. Graphics editing software can include provisions for defining the 3D topology, or brush strokes, comprising the artwork. In some instances, the information-carrying is effected, in whole or part, by the 3D aspects of the art.

While the foregoing disclosure focused on machine-readable symbologies, digital signaling can be effected otherwise. Some techniques are grounded in computer vision (object recognition) techniques. For example, one way to associate an identifier with artwork is through image fingerprinting. Attributes of an artwork, or a portion thereof, are distilled into a set of numbers, or features, which are stored in a database, and later matched against unknown works to identify same. The fingerprint data serves as the identifier. (Image and video fingerprinting techniques are detailed in patent publications U.S. Pat. No. 7,020,304 (Digimarc), U.S. Pat. No. 7,486,827 (Seiko-Epson), 20070253594 (Vobile), 20080317278 (Thomson), and 20020044659 (NEC).)

A particular form of fingerprinting is scale invariant feature transforms (SIFT), as detailed in Lowe, "Distinctive Image Features from Scale-Invariant Keypoints," *International Journal of Computer Vision*, 60, 2 (2004), pp. 91-110; Lowe, "Object Recognition from Local Scale-Invariant Features," *International Conference on Computer Vision*, Corfu, Greece (September 1999), pp. 1150-1157, and in U.S. Pat. No. 6,711,293. Again, SIFT data derived from imagery can be stored in a database, and used as a digital signal by which a visual work (or portion) can be recognized.

In the prior art, images are authored (and music is composed/performed) without regard to recognizability through automated techniques, such as fingerprinting or SIFT. However, some artworks are much more suitable to unambiguous identification by such techniques than others.

In accordance with another aspect of the present technology, software is alert to the recognizability of imagery and image excerpts (or sound and sound excerpts) through one or more recognition algorithms (such as those in common use by smartphones, e.g., SIFT and Shazam). If a piece authored by an artist is found to be marginal, or deficient, in terms of its recognizability, the software can undertake one or more actions. One action is to alert the artist, such as by a warning message presented in a dialog box on the computer screen. Tips to enhance recognizability may be provided in the message. Another action is to automatically adjust the artwork, within certain permitted ranges, to enhance recognizability.

To illustrate with an improbably simple example from the 1D world of audio recognition (the image analog, in 2D, is a bit more complex), consider an audio fingerprinting algorithm that performs an FFT on a 10 second excerpt of music, low-pass filtered at 3 KHz. The audio energy resulting from the analysis is binned into 10 frequency ranges, Bin1 encompasses 0-300 Hz, Bin2 encompasses 301-600 Hz, Bin3 encompasses 601-900 Hz, Bin4 encompasses 901-1200 Hz, etc. The audio fingerprint comprises a four number ordered sequence, identifying the four bins with the most energy, in decreasing order. A particular music excerpt may have dominant tones at 750 Hz, followed by 450 Hz, followed by 1000 Hz, followed by 200 Hz. The fingerprint of such an excerpt is thus {3,2,4,1}.

That's well and good, and unambiguous. But what if the third-most dominant tone was not 1000 Hz, but 1195 Hz? This falls within Bin4. But it is close to falling within Bin5 (1201-1500 hz). In some distortion scenarios (e.g., sped-up radio airplay), or in noisy sensing environments, this element of the fingerprint may be determined to be a "5" instead of a "4." Misrecognition of the music may result.

Accordingly, during composition of the music (or, in the imagery example, during authoring of an artwork), such ambiguous cases can be flagged so that remedial action may be taken, either by the artist, or by the programmed system. The artwork can be tweaked in minor respects to minimize such borderline cases.

Consider the case of SIFT-based object recognition. Basically, SIFT is based on identification of image features (commonly termed keypoints) that survive blurring, and that form recognizable constellations of points despite scaling and rotation. Feature edges in images—particularly corners points—are commonly used as SIFT keypoints.

The image editing software can apply SIFT-based analyses to artwork (e.g., periodically as it is being developed, when it is saved, or at the time of rendering). If an inadequate number of features is found to be identifiable after blurring, or the features are not satisfactorily robust to scaling and rotation, the software can alert the user, and offer tips for improvement.

Tips may include instructions to increase the local image contrast in certain regions; to apply an edge sharpening filter to other regions, etc. The software can highlight the relevant regions, or outline them using an image editing tool provided for this purpose (e.g., the Marquee or Lasso tool) to facilitate the suggested user edits. Or, again, the software can undertake such revisions automatically (perhaps with artist approval).

In some cases the process is iterative, with a potential deficiency noted, an adjustment made, and the resulting work again tested for the deficiency. If it persists, a further adjustment can be made, etc.

Other forms of digital signals can be similarly monitored for effectiveness. If an artist applies a digital signal-conveying light wash to a work, the program may alert the artist if the signal is likely too subtle to be reliably detected. In some embodiments a bar graph or other UI device can be employed to indicate to the artist the strength (detectability) of the artwork's digital signal(s). If the artist provides information about the rendering circumstances, the program can model how the signaling will be transformed by the rendering operation, and the degree to which the signals will be detectable.

(Desirably, detectability is not an issue, because the artwork may conspicuously feature human noticeable attributes of the signal. In such case, the signal is a dimension of artistic freedom in the work; not an artifact to be suppressed or obscured.)

In some instances, the data payload for an artwork element is not fixed at the time the element is added to a canvas. In such case, a placeholder payload can be applied, or a texture or other effect simulating a payload can be used, in representing the work on the artist's computer screen. But this is just an approximation. (Such arrangement is akin to time codes in works that have a time dimension, or pantone color specification for color works.) When the artist's creative process is finished, and it is time to render the work into a final form, the software may fix the data payload(s), e.g., by inviting the artist to provide this information, or by assigning same automatically if the artist does not. At this point, the software generates the patterns and textures that are included in the final output.

In some cases the rendering engine has flexibility in how encodings are expressed. For example, different renderings may be equivalent to the human visual system, but offer different encoding possibilities. Color pairs are one example (c.f., patent application 20060008112). Another is line patterns; the more lines in a region, the less any individual line needs to be altered for line width modulation purposes, etc. The rendering code may alter the work in ways not evident to human viewers, to increase the decodability of one or more associated identifiers. Previous versions of the work, e.g., as viewed by the artist on the screen, are simply proxies for this final work.

Once a work is rendered in its final digital form, the program can analyze this output and generate a map showing the artist the different signals across the work, and their relative strengths (and in some instances their respective scales, or optimal reading distances).

It will be recognized that the different forms of identifiers noted above serve as virtual hooks to which network attributes can attach. Through such hooks, various tags can be applied to artwork—both at the time of its creation and throughout its life.

Art installations increasingly make use of data projectors—devices that project still or moving imagery in accordance with programmed data. Many of the arrangements detailed in this specification can make use of such projectors. For example, in those instances in which augmented reality was mentioned, the superposition of features with artwork can be accomplished, publicly, by a projection system. (A projector may also be included as a smartphone component, and used in many such instances.) As in other arrangements, aspects of the artwork can change as a function of context, such as the particular viewers present, history, time, etc.

Sometimes the scale at which digital signals are sensed by a smartphone can influence their decodability (e.g., a postage stamp-sized barcode marking probably will not be readable from a distance of ten feet). The image editing program can present a dialog box asking the artist to specify a nominal viewing distance. (A default value, such as four feet, may be used if the artist provides no information.) The program may further ask about the height or width of the artwork as it is expected to be finally rendered. (Canvas size is typically specified as part of an artwork's creation, but this size is sometimes not accurately indicated, or the artist may decide to render the artwork at a different scale.)

Based on the indicated viewing distance and dimension, the digital signal (e.g., machine readable encoding) can be scaled to assure detectability. Desirably, the distance and dimension information is available before the graphical elements incorporating such features are applied by the artist to the canvas (or completed by the software). Knowing these parameters, the encoding can be sized appropriately in the palette, and the artist can correctly judge its effect in the artwork as presented on screen. However, if the artist later decides to change, e.g., the scale of the work, the program can automatically adjust the scale of the digital signal to assure detectability under the revised circumstances.

The ratio between viewing distance and dimension is usually the key parameter. (A four foot print viewed from four feet has similar detection attributes as a ten foot print viewed from ten feet.) If one is changed without the other, a change in the scale of the encoding may prove beneficial.

In some cases, however, the artist may desire that artwork convey different impressions from different perspectives. Signals in the artwork may serve such purpose. For example, the artwork may incorporate digital signals at different scales—sensing from one distance yields one identifier; sensing from another distance yields another identifier. Similarly, the signals may be geometrically warped in anticipation of viewing from certain perspectives.

Figure 6A:
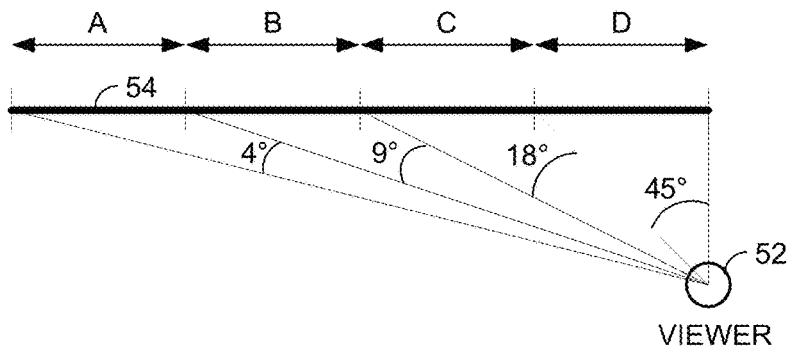
FIG. 6A is a top-down view showing, for four vertical zones A-D of a display screen, how more distant parts of the screen subtend smaller angles for a viewer.

Consider FIG. 6A, which is a top-down view showing how a viewer, at position 52, perceives an artwork 54, when viewed from near the right edge.

If the artwork is regarded as having four equal-width vertical quarter-panels A-D, it will be seen that the nearest panel (D) subtends a 45 degree angle as viewed by the observer. The other quarter-panels C, B and A subtend progressively smaller ranges of the observer's field of view. (The entire artwork spans about 76 degrees of the observer's field of view, so the 45 degree apparent width of the nearest quarter-panel is larger than that of the other three quarter-panels combined.)

Figure 6B:
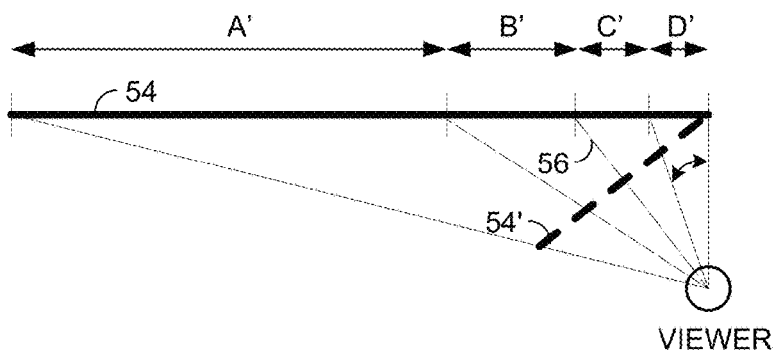
FIG. 6B shows how the phenomenon of FIG. 6A can be redressed, by pre-distorting the information presented on the screen.

In anticipation of this distortion, and to provide a signal to viewers on the right side of the work that is unavailable to viewers, e.g., on the left side of the work, the image editing software can warp the digital signal characteristics in accordance with the location of the viewer. FIG. 6B illustrates one form of such distortion. If the artwork 54 is again regarded as having four vertical panels, they are now of different widths. The furthest panel A' is much larger than the others. The warping is arranged so that each panel subtends the same angular field of view to the observer (in this case about 19 degrees).

To a first approximation, this distortion can be viewed as projecting the digital signal from artwork 54 onto a virtual plane 54' (FIG. 6B), relative to which the observer is on the center axis 84.

Figure 7:
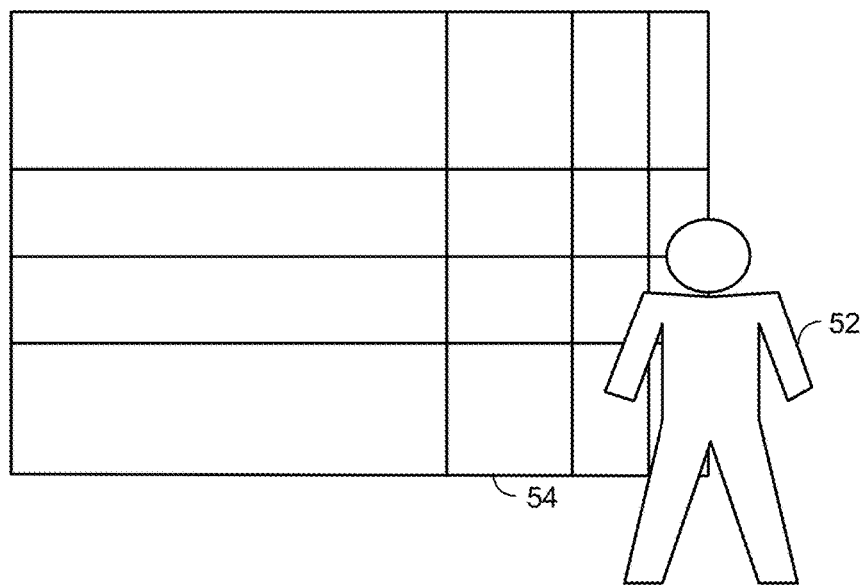
FIG. 7 shows how signals in art can distorted in vertical and horizontal dimensions, in accordance with position of a viewer.

FIG. 7 shows the result of this signal warping, in two dimensions. Each rectangle in FIG. 7 shows the extent of one illustrative signal (e.g., watermark) tile. Tiles nearest the viewer are relatively smaller; those remote are relative larger. (Naturally, in practical application, an artwork will rarely have signal elements of a tiled shape; however, this assumption facilitates explanation.)

The tile widths shown in FIG. 7 correspond to widths A'-D' of FIG. 6B. The tile heights also vary in accordance with vertical position of the observer's perspective (here regarded to be along the vertical mid-line of the artwork). Tiles near the top and bottom of the artwork are thus taller than tiles along the middle.

When the signal tiles are warped in the FIG. 7 fashion, the signal detector finds that each tile has substantially the same apparent scale. No longer does a portion of the artwork closer to the observer present larger tiles, etc.

Such arrangements allow the artist to author different network linkages from different perspectives. A child viewing a work from a lower height may be afforded one set of network features; an adult viewing from a greater height may be linked to others. (In similar fashion, different vantage points from around a sculpture may lead to different network responses.)

In some cases an artist may provide a digital signal at one scale in one region of an artwork, and a similar signal, at a different scale, in an adjoining region. In such case, the software tool can include a function (either manually invoked, or automatic) to blend the two regions, and their respective signals, so that the transition in signal scale is not visually apparent.

Some artworks pass through a workflow involving several different parties. For example, one artist may produce artwork for a magazine cover, working at a magnified scale (e.g., with the artwork three feet in height). This art may be passed to the magazine's art department, which changes the height to eleven inches, and adds graphical elements such as the magazine title, issue number, and article teasers. It may also slightly adjust the colors in anticipation of the inks used by the publisher. This revised art may be passed to the printer, which "rips" it—applying parameters specific to the hardware press on which it will be reproduced. One or more of these further parties in the workflow may also be granted permission to elaborate on the artwork's network extensions. (Post-production workflows in movies and music provide models for collaborative endeavors that may become common with signal rich art.)

In some cases, artwork having network adjuncts has one of several "looks" by which it can be recognized as having such additional features—at least when viewed by certain users. Just as different comic strips have distinctive looks, and anime videos have distinctive looks, styles may emerge by which signal rich art can also be identified—alerting viewers that associated network functionality is available for access. (Alternatively, distinctive logos or icons may serve this purpose.)

In other cases, artworks may have network adjuncts without advertising this fact. Banknotes may be one example. (Banknotes may use a network capability for functional and aesthetic roles—enabling transactions, communicating about the national culture, etc.)

The foregoing discussion contemplated that the authoring software always provides the detailed support for signal rich art. In some arrangements, however, this functionality is a mode that can be enabled or disabled. For novice users, or those with no interest in network aspects of art, the functionality can be turned off. For other users, the signal rich mode can be activated.

More Tools

An embodiment incorporating certain principles of the present technology is a paintbrush. Like most paintbrushes, the present paintbrush includes a body portion and a set of bristles (or other filaments). The body portion is typically held by the user. The bristles extend from the body of the brush (or, in some implementations, from a ferrule, which is regarded as part of the body) and serve to convey paint or other marking fluid from a source to a writing medium. This fluid source can be external, e.g., a palette or an inkwell, or it may comprise part of the implement—such as an ink reservoir in the paintbrush body.

Included, in a particular embodiment, is a mechanism by which the bristles can be moved relative to the body, in response to electronic control signals. One such mechanism is a piezo-electric actuator, which applies a mechanical force in response to applied voltage. This force can be used to extend the set of bristles further from the paintbrush body (or ferrule). (Similarly, the removal of such an applied voltage, or the application of a voltage of opposite polarity, causes the set of bristles to retract. For expository convenience, all such operations may be regarded as extending the bristles—the latter simply by a negative amount.) The lengths of the bristles (or, more accurately, the lengths of their free portions) are thus varied in accordance with the control signal.

A variant embodiment employs a MEMS (microelectromechanical system) device to move the bristles, rather than a piezo-electric unit. Another embodiment employs a solenoid with a spring-biased armature. Other forms of actuators can similarly be used.

A controller typically generates the electrical signals to which the actuator responds. This controller can be integrated with the brush (e.g., disposed in the body), or it can be external. An external controller can be coupled to the actuator wirelessly, using known technologies. One particular form of a controller is a digital-to-analog converter device, which receives control signals in digital form, and outputs corresponding analog signals to drive the actuator.

Figure 8A:
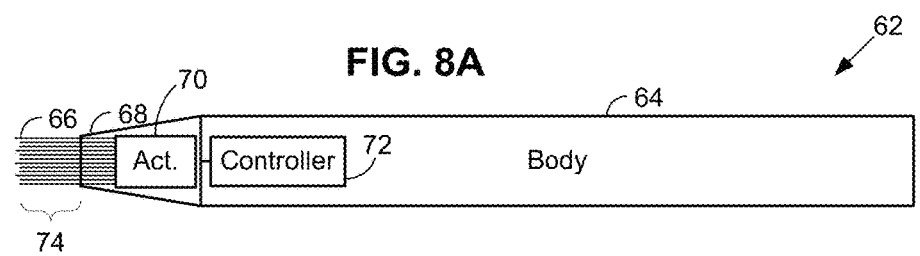
FIGS. 8A and 8B show a paintbrush employing certain principles of the present technology.
Figure 8B:

A particular brush 62 is depicted schematically in FIGS. 8A and 8B, and includes a body 64, bristles 66, a ferrule 68, an actuator 70, and a controller 72. In FIG. 8B, the bristles 64 are relatively extended; in FIG. 8A they are relatively retracted. Typically, the bristles are confined somewhat snugly by the ferrule 68 (while still permitting their linear extension). Thus, only portions 74 of the bristles that extend beyond the ferrule are free to flex and move in response to the artist's movement with the brush.

As the artist touches down on the brush, and urges the bristles onto the canvas or other medium, the bristles naturally spread. In response to such action, the relatively extended bristles of the FIG. 8B brush—with their longer free portions—spread more broadly than the relatively retracted bristles of the FIG. 8A brush. This causes the brush of FIG. 8B to deposit a broader stroke than the brush of FIG. 8A, when the brushes are used in the same manner by the artist.

Figure 9A:
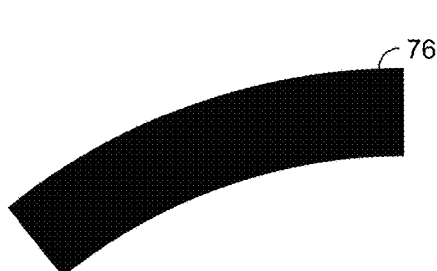
FIGS. 9A and 9B show brush strokes that may be created with the brush of FIG. 8.
Figure 9B:

This is shown in FIGS. 9A and 9B. FIG. 9A shows an exemplary brush stroke 76 made without any bristle actuation. FIG. 9B shows, at 78*a*, how the width of the stroke enlarges when the bristles 66 are extended from the brush (as in FIG. 8B), allowing them to spread more broadly in response to the artist's touch. At 78*b*, the bristles are retracted back into the brush (as in FIG. 8A)—returning the stroke to its former width. The illustrated modulation of line width occurs without any change in pressure by the artist. The artist simply paints as before—the changing of the stroke width occurs independently of any deliberate artist action.

The magnitude of the broadening is dependent on the artist's brush pressure, and the angle of the brush relative to the medium. These parameters may be regarded as the "pose" of the brush. It will be recognized that the width of the stroke is primarily a function of the pose of the brush—as set by the artist, and is only secondarily dependent on modulation due to the actuator.

The amount of stroke broadening shown in FIG. 9B is 30+%. This is larger than is typical, and is so-depicted simply for clarity of illustration (although in some embodiments there may be broadening of 5%, 10%, 20% or more). More typically, the broadening is below 5%, with 2% or 3% perhaps being typical. Again, however, more extreme cases may have broadening of less than 2%, 1%, or even 0.5%. Usually, all such encoding is "steganographic" in that it conveys information to a suitably-equipped detector, but the presence of such encoding is overlooked by casual human observers (and may be so minute that it cannot be perceived with the human visual system even with focused study).

The stroke-width transition at 78*a* is rounded. The shape of this round in a function of the speed at which the bristles extend, and also the speed at which the artist is moving the brush.

Figure 10:
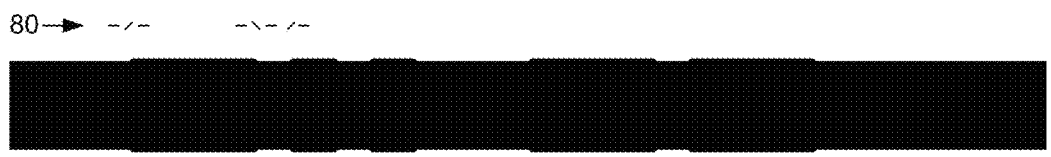
FIG. 10 shows a brush stroke modulated in accordance with an information-conveying code.

By modulating the width of the brush stroke, digital data can be conveyed. FIG. 10 shows one such arrangement, in which the broadened areas correspond to dots and dashes of Morse code—here representing the letters DM. A related coding system adapts a 2D barcode symbology, with broad barcode lines expressed as longer areas of stroke-broadening (like the 'dashes' of FIG. 10), and thin barcode lines expressed as shorter areas of stroke-broadening (like the 'dots' of FIG. 10).

While the just-noted coding arrangements use binary symbols (i.e., long and short broadened areas), other arrangement can naturally use three or more different symbols. Or, forms of unary coding can be employed. Also, in practical implementation, the coding system employed would typically include built-in redundancy with error correction, to allow reliably correct decoding despite different forms of distortion. (Turbo codes, LDPC codes, Reed-Solomon, Viterbi codes, etc., are some codes that may be used.)

An exemplary decoding system is next described. The artisan will recognize that a great variety of methods can be employed; the following is simply a sample.

Decoding starts with capturing a digital image of the artwork. An image processing software program then identifies edges in the digital image using known techniques. Examples include the Canny, Differential, and Sobel methods. Once edges are identified, the program steps along the identified edges—computing the tangent or normal function for short excerpts (e.g., using the positions of the previous, say, 2, 5, or 15 pixels, assuming the analysis is performed in the pixel domain). This computation is performed with successively overlapping sets of edge pixels, yielding a series of data related to the edge orientation. (A series of tangents is shown at 80 in FIG. 10.) The resulting series of tangent or normal function data is examined for change exceeding a threshold (e.g., an orientation change greater than 3, 10 or 30 degrees), followed by a return to a value within a first threshold (e.g., 2, 6 or 20 degrees) of the earlier value. Each such event signals a point at which the contour has 'jogged' briefly. Such analysis continues—identifying the locations at which the edge shifts.

To determine whether the shift represents a broadening or a narrowing of the stroke, the program can perform a similar analysis on nearby edge contours that are generally parallel to the analyzed edge. Thus, in the FIG. 10 example, the program finds that the bottom edge of the depicted stroke is generally parallel to the edge just-discussed, and examines shifts in this lower edge. Generally, the detected shifts in the two edges should exhibit inverse spatial correlation (a measure that can serve as a metric for decoding confidence). By such method, the program identifies where the stroke is broadened, and where it is narrowed—thereby yielding the information needed to extract the earlier-encoded information.

The just-detailed method is suitable regardless of whether a dark stroke is painted on a light background, or a light stroke is painted on a dark background. If the program has knowledge about whether a stroke is relatively dark or relatively light, then it can extract the needed information for decoding by reference to a single edge contour—without looking for a parallel edge with spatially correlated shifts. That is, if the stroke is dark, then a shift of the contour away from the dark body of the stroke is known to be a broadening. However, without such information, then a shift of the contour up and away from a dark area (such as on the upper edge of FIG. 10) may be either a broadening of a dark stroke (located below), or a narrowing of a light stroke (located above).

In the examples just-given, correct decoding requires knowledge of the coding direction. In the depicted Morse code arrangement, the code advances with the artist's stroke. But a later decoder does not know whether a subject stroke was painted from left-to-right, or from right-to-left. Thus, desirably the coding includes an indication about direction. A simple indication is the periodic use of a symbol that has no valid inverse (e.g., the letter Z in Morse is dash-dash-dot-dot; Morse has no dot-dot-dash-dash symbol). When such a symbol is found, the correct decoding direction is thereby indicated.

A related issue concerns clocking. In some embodiments (but not all) the broadening and narrowing of brush strokes occur at temporally-defined intervals, e.g., every tenth or half second. Depending on the speed with which the artist moves the brush, a "dash" in the FIG. 10 example may be an inch long, or a small fraction thereof. A decoder encountering a series of quarter-inch broadened regions may not know whether they represent a series of dashes or a series of dots. Desirably a symbol is inserted periodically by which the decoder can use as a reference in detection. Again, the Morse letter Z is a simple example, as it includes both dashes and dots. By providing such a symbol periodically, the decoder has a reference by which it can distinguish dashes and dots.

As just-suggested, the broadening and narrowing of brush strokes needn't be temporally-based. Instead, these variations can be spatially-based. For example, the extent of a dash may be set in space (e.g., a half-inch) rather than in time (e.g., a half-second). So-doing requires knowledge of the brush's location on the medium.

There are many techniques known for position determination; virtually any can be used. One is to position the medium on a platen that senses the X-, Y-position of the writing implement, such as by pressure, capacitance, electromagnetic induction, etc. Particular examples include the graphics tablets manufactured by Wacom (e.g., the Intuos 4, and Bamboo Pen), in which the writing implement generates an electromagnetic signal that is sensed by a grid of wires in the underlying platen (or, reciprocally, in which the grid of wires emit electromagnetic signals that are detected by a sensor in the implement). In such embodiments, power for the circuitry in the writing implement can be derived, e.g., inductively, from the platen below.

Other position-sensing arrangements are acoustic in nature, with the writing implement issuing ultrasonic clicks that are sensed by microphones near the periphery of the medium. Time-of-acoustic-travel is used to locate the writing implement in X- and Y-.

Optical techniques can also be used. Such arrangements employ a small camera in the writing implement to sense features on the medium that are correlated with location. (In some embodiments the paper is lightly marked with dots that encode position data.) Examples are shown in Anoto's U.S. Pat. Nos. 5,477,012, 6,570,104 and 7,588,191, and in Silverbrook Research's U.S. Pat. Nos. 6,870,966 and 7,396,177.

GPS, in its current form, is not well suited to the present application, due to the relative coarseness of location information. However, other radio-based location technologies can be employed. One type utilizes radio signals of the sort that are that commonly exchanged between devices (e.g., WiFi, cellular, etc.). Given several communicating devices, the signals themselves—and the imperfect digital clock signals that control them—form a reference system from which both highly accurate time and position can be abstracted. Such technology is detailed in published patent applications 2009213828, 2009233621, 2009313370, 2010045531, and 2010202300. A writing implement can be equipped with a transmitter, and two or more other stations can communicate with it to thereby determine the implement's location.

Yet another position sensing system relies on accelerometers or gyroscopic devices within the brush, to track its movement over time. (A MEMs accelerometer that can be used in certain embodiments is the LIS302DL, a three-axis device manufactured by STMicroelectronics. A suitable 3-axis gyroscope is the STMicroelectronics L3G4200D.) A variety of known software can take input data from such a device, and discern—in relative spatial terms—how the device moves in space and time.

In embodiments in which the available position data is from a location other than the tip of the implement (e.g., from a sensing device in the body of a brush), an algorithm can be applied to re-map the original sensed data to deduce the corresponding position at the tip of the implement.

In still other arrangements, the position/movement of the user's hand may be tracked (e.g., by a MEMs or radio device in a ring worn by the user) rather than the position/movement of the implement, per se. (Again, the position/movement data from such system can be processed to deduce the position/movement at the tip of the implement.)

Figure 12:
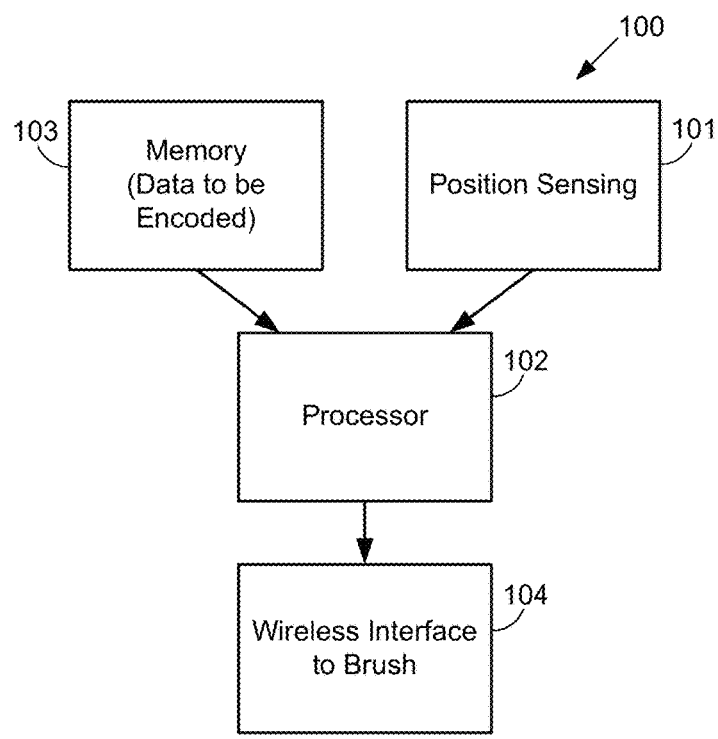
FIG. 12 is a block diagram of an illustrative system using a position-based encoding arrangement.

FIG. 12 shows an illustrative system using a position-based encoding arrangement 50. A module 51 determines position of the brush using one of the foregoing techniques. A memory 53 provides a data payload that is to be encoded into the artwork. A processor 52 notes where the brush is on the medium and, based on this data and on the information to be encoded, sends data to the brush actuator—through a wireless interface 54—instructing whether the bristles should be extended. As the artist moves the brush to different positions on the canvas, the processor 52 sends updates to the actuator, so that in some locations the bristles are extended, and in other locations they are not. The edges of the brush stroke contour are dynamically tweaked in position, in accordance with brush location.

(In some embodiments, such as those in which the brush senses its own location, a back-channel can be provided through which the brush can transmit data to the wireless interface 54.)

While the arrangements previously-described may be regarded as using one-dimensional encoding (e.g., along the contour of a stroke), other embodiments can employ two-dimensional encoding. An example of two-dimensional encoding is the digital watermarking technology detailed in Digimarc's U.S. Pat. Nos. 6,345,104, 6,449,377, 6,590,996 and 7,286,684.

In one particular such embodiment, the artwork canvas is virtually divided into a grid of 2D tiles, each about 5-50 cm on a side. Each of these tiles, in turn, is virtually divided into an array of 128×128 "waxels" ("watermark elements"). The luminance of each of these waxels, relative to its four or eight nearest neighbors (c.f., Digimarc's U.S. Pat. Nos. 6,483,927, 6,580,809 and 7,231,061), is adjusted slightly up or down to effect encoding of a pattern that conveys the desired message payload. The pattern can also include a calibration signal to aid in extraction of the encoded message payload (as further detailed in the just-cited patents).

In another particular embodiment, the artwork defines a single watermarking tile; there is no tiled redundancy.

In some such embodiments, the brush may have two or more actuators, by which the stroke width can be bulged slightly on one side of the brush (e.g., by extending the length of those filaments) without changing the contour on the other side. The position information output by module 51 can indicate not only the X-Y position of the brush, but also its spatial orientation, allowing the two actuators to be controlled independently to change the two contours of the stroke independently. By such arrangement, a brush stroke contour can be slightly adjusted to deposit more, or less, paint in a given waxel, under control of the processor 52.

The processor 52 can consider not just the brush's present location, but also the direction in which it is traveling, and send instructions to the brush actuator(s) in anticipation of where the brush appears to be headed. This is desirable because there is a small, but detectable, interval between when instructions to extend bristles are sent to the brush, and when the lengthened bristles actually spread wider under the artist's touch to start depositing a broader stroke.

A reference frame for the watermark (e.g., its origin point, and orientation) may be established by the artist's initial use of a clean brush, or other drawing implement. In an exemplary arrangement the artist touches three locations on the media in rapid succession (e.g., within a threshold interval such as 1-4 seconds). An accelerometer in the instrument communicates the three taps or touches (i.e., three de-accelerations exceeding a threshold value) to associated watermark encoding software. (The spatial locations of the taps are also determined by means described below.) These taps indicate to the software that the drawing device is ready for action, and the three points in space where the drawing surface was touched define a two-dimensional plane in 3D space. The first touched point can arbitrarily become the origin of a watermark grid system, and the line between the origin and the second tapped point can become the X- or Y-axis of the coordinate system in 3D space. (The MEMs device itself and its associated software usually employs a different, relatively random 3D origin for its own tracking of 3-dimensional movement, e.g., the device position when it was first powered, or most recently reset.)

In another arrangement, the spatial definition of the 2D drawing plane can be sleuthed by simply having a person draw something over a few seconds' interval, or write a quick word or two, etc. The positions indicated by the system sensors define the plane of the work. The initial point of contact can define the origin, and the direction of initial implement movement can define a reference axis.

In still other embodiments, the origin and a reference axis can be established randomly, or by some other algorithm, once the plane of the work is known.

The watermark encoding software chooses a characteristic waxel size (which may typically be on the order of 1-5 mm or so for something like a magic marker), and proceeds to virtually map out an embedding template (e.g., 128×128 waxels) within the newly defined 2D plane within 3D space. The watermark embedding software monitors the ongoing progress of the "tip" of the drawing device, and when it sees that the tip is getting to within a couple centimeters of the virtual 2D watermarking plane, it begins to send control signals to the implement. Then, as the tip of the drawing device moves from region to region within the 2D watermarking plane, instructions are sent to the implement to modulate its output according to the values contained in the 2D watermark embedding template. It may be noted that this is a "differential embedding" approach, as opposed to a straight-forward embedding approach. That is, in order to create a "darker waxel" next to a "lighter waxel," the watermarking software needs to also understand spatial trajectories of the tip, and as it moves toward a "darker waxel," it needs to jiggle bristles toward that region as it approaches the region, thus applying more paint there. Then, as it crosses over the region and moves on, the instruction to the actuator may cause the bristles to extend back towards the darker region, thus continuing to try to apply more paint to the area on the drawing surface calling for a darker waxel.

A watermarked artwork may be decoded using a mobile phone with suitable decoding software. The software may expect sparsely-covered watermark source material, such as handwriting—in which case the captured image data may be filtered, or otherwise pre-processed, so that pixel regions that probably haven't been affected by the watermark signal are discarded. (For example, in embodiments in which watermarking is effected by modulating the edges of brush strokes, a region of a painting that is devoid of edges, e.g., a blue sky, may be disregarded in a watermark decoding operation.) Conversely, the software can analyze captured image data to identify regions that seem most-likely to convey watermark data, and focus its decoding effort on such regions. U.S. Pat. Nos. 6,442,284, 6,516,079 and 7,013,021 detail techniques of this sort.

As noted in the cited patents, the watermark decoder can combine corresponding waxels from several tiles to increase signal-to-noise ratio before applying a decoding algorithm.

Having described and illustrated the principles of our technology with reference to various embodiments thereof, it should be apparent that the invention can be modified in arrangement and detail without departing from such principles.

Figure 11A:
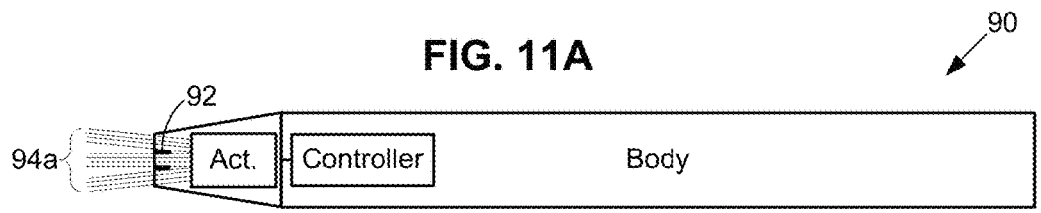
FIGS. 11A and 11B show another paintbrush employing certain principles of the present technology.
Figure 11B:
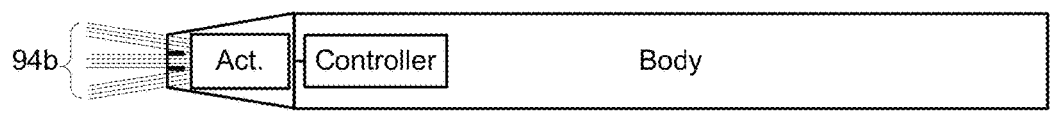

For example, while the earlier-detailed brush 12 extends the bristles generally along the axis of the paintbrush body, another arrangement causes the bristles to spread out—away from the axis of the body (in some cases radially outwardly). One such arrangement is shown in the brushes 90 that are depicted, in section, in FIGS. 11A and 11B. Here, a dispersing member 92 (e.g., a hollow cylinder) is formed within the ferrule. As some of the bristles are forced towards the dispersing member 92 by the actuator, they are deflected outwardly. This causes the bristles to fan out, to a degree dependent on the actuator control signal. Thus, the fan width 94b of the brush with extended bristles is greater than the fan width 94a of the brush with retracted bristles. (The bristles are shown lighter in FIGS. 11A and 11B to better show the dispersing member 92.)

In the above-described embodiments, the bristles are pushed—or pulled—from their ends by an actuator. In other arrangements, an actuator can otherwise cause deflection or other movement of the bristles. For example, the bristles may be fastened to a stationary member in the brush body, and an actuator can act at an intermediate location along their length to bias the bristles in one direction or another.

Similarly, while the discussed embodiments each employed a single actuator, in other embodiments, plural actuators can be used. For example, two or three actuators can be provided, e.g., one to control position of the bristle tips in an X-direction, and/or one to control position of the tips in a Y-direction, and/or one to control position of the tips in a Z-direction.

While linear actuators have been particularly noted, other types of actuators (e.g., rotary) can naturally be employed. Likewise, members that move in response to magnetic, electrostatic, or other stimulus can be employed with similar effect.

The brush bristles can be of any desired type, e.g., sable, nylon, etc.

While the detailed embodiment particularly considered modulating the width of strokes to convey data (i.e., changing luminance), this is but one of many different parameters that may be changed to effect data encoding. A few others include saturation, density, color, texture and pattern. From the teachings herein, an artisan can adapt encoding and decoding methods based on variations in one or more such parameters.

It will be recognized that a brush is but one type of writing implement that can utilize the concepts detailed herein. Pencils, crayons and ink pens are others. A particular type of ink pen that offers digital control of various stroke parameters is detailed in U.S. Pat. No. 7,396,177 (attached hereto as Appendix A, and forming part of this specification).

Although described in the context of a brush that deposits ink on a physical medium, the same principles are applicable to digital art creation tools—such as using a stylus on a drawing tablet using Photoshop.

Related technologies are detailed in the following patent publications: 20040189620, 20050123340, 20070139399, 20080055279, 20080152202, 20090267896, U.S. Pat. Nos. 5,215,397, 5,247,137, 5,294,792, 5,434,371, 5,781,661, 5,781,661, 5,981,883, 6,573,887, 6,698,660, 7,773,076, 7,796,819, and WO2006068357.

Intuitive computing technologies, of which the present technology may be regarded as an example, are detailed in Digimarc's published PCT application WO2010022185 and in pending application Ser. No. 12/797,503, filed Jun. 9, 2010 (published as 20110161076).

Other Comments

While the specification has made repeated reference to elements such as smartphones and graphical user interfaces, it will be recognized that many of the detailed elements will be superseded in years to come. Head-worn display devices with integrated cameras (e.g., the Vuzix iWear VR920), and gestural interfaces (e.g., Microsoft's Kinect), for example, are already appearing. Thus, it should be recognized that the detailed arrangements are illustrative, and not meant to limit the forms in which the detailed technology can be practiced.

Steganography and digital watermarking techniques, and applications responsive to digital signals in content (e.g., "Mediabridge"), are detailed in Digimarc patents including U.S. Pat. Nos. 6,122,403, 6,590,996, and 6,947,571, and published application 20060115110.

Image and video fingerprinting techniques are detailed in patent publications U.S. Pat. No. 7,020,304 (Digimarc), U.S. Pat. No. 7,486,827 (Seiko-Epson), 20070253594 (Vobile), 20080317278 (Thomson), and 20020044659 (NEC).

Information about palettes, brushes and other aspects of the Photoshop user interface are detailed in Adobe's patent literature, including U.S. Pat. Nos. 4,837,613, 5,592,602, 5,870,091, 6,606,105, 6,606,166, 20020130908, 20020150307, 20040246271, and 2005001854.

The design of smartphones and computer devices referenced in this disclosure is familiar to the artisan. In general terms, each includes one or more processors (e.g., of an Intel, AMD or ARM variety), one or more memories (e.g. RAM), storage (e.g., a disk or flash memory), a user interface (which may include, e.g., a keypad, a TFT LCD or OLED display screen, touch or other gesture sensors, a camera or other optical sensor, a compass sensor, a 3D magnetometer, a 3-axis accelerometer, a microphone, etc., together with software instructions for providing a graphical user interface), interconnections between these elements (e.g., buses), and an interface for communicating with other devices (which may be wireless, such as GSM, CDMA, W-CDMA, CDMA2000, TDMA, EV-DO, HSDPA, WiFi, WiMax, mesh networks, Zigbee and other 802.15 arrangements, or Bluetooth, and/or wired, such as through an Ethernet local area network, a T-1 internet connection, etc).

More generally, the processes and system components detailed in this specification may be implemented as instructions for computing devices, including general purpose processor instructions for a variety of programmable processors, including microprocessors, graphics processing units (GPUs, such as the nVidia Tegra APX 2600), digital signal processors (e.g., the Texas Instruments TMS320 series devices), etc. These instructions may be implemented as software, firmware, etc. These instructions can also be implemented in various forms of processor circuitry, including programmable logic devices, FPGAs (e.g., Xilinx Virtex series devices), FPOAs (e.g., PicoChip brand devices), and application specific circuits—including digital, analog and mixed analog/digital circuitry. Execution of the instructions can be distributed among processors and/or made parallel across processors within a device or across a network of devices. Transformation of content signal data may also be distributed among different processor and memory devices.

Software instructions for implementing the detailed functionality can be readily authored by artisans, from the descriptions provided herein, e.g., written in C, C++, Visual Basic, Java, Python, Tcl, Perl, Scheme, Ruby, etc. Known image editing software, such as Adobe's Creative Suite (including Photoshop) and GIMP, and known augmented reality software, such as UrbanSpoon, Layar, Bionic Eye, Wikitude, Tonchidot, etc., can be adapted for many of the uses detailed herein. (GIMP is image editing software similar to Photoshop, but for which source code is available from the gimp<dot>org web site.)

Commonly, each device includes operating system software that provides interfaces to hardware resources and general purpose functions, and also includes application software which can be selectively invoked to perform particular tasks desired by a user.

Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems—a special purpose computer system in which the operating system software and the application software is indistinguishable to the user (e.g., as is commonly the case in basic cell phones). The functionality detailed in this specification can be implemented in operating system software, application software and/or as embedded system software.

Any of the processing entailed in embodiments incorporating the present technology can be performed "in the cloud."

U.S. Pat. No. 6,577,746 notes that a photocopier may identify an image in a scanned paper document by reference to embedded watermark data, and can then use this identification to download a pristine version of the same image for substitution into photocopied output, yielding a "copy" that may be better than the original. Relatedly, imaging devices such as smart phones may recognize imagery, such as elements of artwork, and download versions of the same or related content for viewing or other use. (A tourist may take a snapshot of the Eiffel Tower. By feature recognition such as SIFT or image fingerprinting, the camera may be able to identify the subject of the photo, and perhaps the viewing pose, and then access a large archive of related imagery. The camera may then query the user whether he would like the camera to obtain a high resolution view of the scene suitable for framing, a nighttime shot, a sunset depiction, etc., etc.)

As will be recognized, the present specification has detailed many novel arrangements. Due to practical constraints, many such arrangements are not claimed in the original filing of this application, yet applicants intend to claim such other subject matter in subsequent applications claiming priority. An incomplete sampling of some of the inventive arrangements is reviewed in the following paragraphs:

An arrangement including program instructions stored on a computer readable medium, and operative to configure a programmable processing system to perform acts including (a) provide plural authoring tools that enable a user to define elements of a work of art, at least one of said tools providing a network hook by which network functionality can be associated with an element; and (b) provide at least one network authoring tool that enables a user to define network functionality associated with one or more of said network hooks. By such arrangement, the configured system is adapted to produce artwork comprised of elements, at least certain of which are associated with user-defined network functionality.

An arrangement for authoring an artwork, that includes providing (e.g., in a graphical user interface) a first tool configured to be manipulated by a user to define one or more elements of an artwork, such one or more elements comprising a network hook by which network functionality can be associated with the artwork; and also providing a second tool that enables a user to define network functionality associated with one or more of said network hooks. By such arrangement, artwork can be produced associated with user-defined network functionality.

Another arrangement is an authoring system that includes a processor, a memory and a display, the memory including instructions that program the processor to present a user interface that includes, on the display: (a) first portion from which a user can select a portion of an artwork, and (b) a second portion from which the user can select network functionality to be associated with said selected portion.

A further arrangement includes receiving data corresponding to a user's first art stroke, and establishing (in an artwork) a first stroke region that includes a first digital signal; then receiving data corresponding to a user's second art stroke, and establishing in the artwork a second stroke region that includes a second digital signal; and then storing information in a data repository, where the stored information associates a first network function with the first stroke region of the artwork, and associates a second network function with the second stroke region of the artwork.

Another aspect is an arrangement including: receiving, through a user interface, user instructions defining an arrangement of elements to form a work of artwork, where the artwork including a representation of a face; and then— through use of a hardware processor—modifying the representation of a face to convey a digital signal representing plural symbols.

A still further aspect is a work of visual art presented on a tangible display or medium, where the work of art includes a digital signal that is associated with auxiliary information (e.g., audio information) for presentation to a viewer, and where the association changes over time. Thus, a viewer at a first time is presented with first auxiliary information, and a viewer at a later time is presented with second, different, auxiliary information.

A related aspect is a work of visual art that includes a digital signal that is associated with auxiliary information for presentation to a viewer, wherein the association varies with different viewers. Thus, a first viewer is presented with first auxiliary information, and a second viewer is presented with second, different, auxiliary information.

Another related aspect is a work of visual art having a first region including a first digital signal that is associated with first audio information, and having a second region including a second digital signal that is associated with second audio information different than the first. Thus, a viewer can be presented with the first or the second audio information, depending on a region of the art with which the viewer interacts.

Another arrangement is a writing apparatus that includes a body, an actuator, and plural filaments extending from the body. The actuator is adapted to move the filaments relative to the body, in response to electronic control signals.

Another of the detailed arrangements is a method that includes determining a spatial position of a writing implement over a writing medium; and discharging a writing fluid from the writing implement onto the writing medium, to form a written stroke. A parameter of the written stroke—comprising at least one of saturation, density, thickness, color, or pattern—is controlled both by a pose of the writing implement relative to the medium, and, to a lesser extent, by said determined spatial position of the writing implement.

Another arrangement is a method that includes sensing touches of an implement at first, second and third spaced-apart positions on a surface, and determining a 2D plane in 3D space by reference to locations of said touches. The method further includes defining a reference axis by reference to locations of two of said touches, and defining an origin of a coordinate system in the plane by reference to one of the touches. Such operations establish a virtual coordinate framework by reference to which strokes comprising artwork can be located.

To provide a comprehensive disclosure without unduly lengthening this specification, applicants incorporate by reference the patents and other documents referenced herein. (Such references are incorporated in their entireties, even if cited above in connection with specific of their teachings.) These references disclose technologies and teachings that can be incorporated into the arrangements detailed herein, and into which the technologies and teachings detailed herein can be incorporated.

We claim:

1. A method of providing augmentation data to sensor-equipped user devices, the method comprising the acts:

providing artwork for a first printed item, the artwork including a machine-readable code, the machine-readable code encoding a plural-bit identifier;

creating an augmentation to be presented on a display of a sensor-equipped user device, when the artwork is imaged by the sensor-equipped device, and storing augmentation data defining said augmentation, in association with said identifier;

in connection with imaging of the artwork by a first sensor-equipped device, (a) logging, in a database record, data associating said device and the first printed item, indicating said device has interacted with the first printed item; and (b) sending the stored augmentation data to said device, for presentation of the augmentation on a display of said device; and in connection with imaging of the artwork by a second sensor-equipped device, (a) logging, in a database record, data associating the second device and the first printed item, indicating the second device has interacted with the first printed item; (b) determining, from previously-logged data, that the second device has previously interacted with different printed items, including different machine readable codes; and (c) based on said determination, sending augmentation data to the second device that is different than the stored augmentation data sent to the first device.

2. The method of claim 1 in which the stored augmentation data comprises an augmentation overlay that is to be presented on a display of a camera-equipped user device, together with imagery captured by the camera of said device.

3. A method for authoring product packaging label artwork comprising the acts:

providing a graphical user interface that includes authoring tools enabling a user to edit layered elements of product packaging label artwork, said layered elements including first and second layered elements;

receiving a first plural-bit identifier;

steganographically-encoding the first identifier in said first layered element by digital watermarking, but not in said second layered element;

determining, by a modeling act based on input specifying rendering circumstances, how the steganographic encoding of the product packaging label artwork will be transformed by a rendering operation, said determining comprising assessing relative strength of the steganographic encoding after such rendering operation;

presenting results of said assessment for user review, in the form of a 2D strength map; and after said analyzing, revising the steganographic encoding of said first identifier in said first product packaging label artwork layered element;

wherein at least certain of said acts are performed by a processor-controlled hardware system.

4. The method of claim 3 in which the determining act includes rendering the product packaging label artwork.

5. The method of claim 3 in which the determining act includes modeling the rendering of the product packaging label artwork.

6. The method of claim 3 in which the steganographic encoding comprises subtracting an encoding pattern from the first layered element.

7. The method of claim 3 in which the revising comprises a software tool responding to said act of assessing by automatically adjusting the artwork to enhance recognizability of the steganographic encoding.

8. The method of claim 3 wherein the product packaging label artwork also includes a second product packaging label artwork element that conveys a plural-bit identifier, wherein detection of the first product packaging label artwork element at a first region by a consumer's mobile device leads to presentation of a first network response to the consumer, and detection of the second product packaging label artwork element at a second region by the consumer's mobile device leads to presentation of a second, different, network response to the consumer.

9. The method of claim 8 in which the second identifier is different than the first identifier.

10. The method of claim 8 in which the second product packaging label artwork element comprises a 1D or 2D barcode.

11. The method of claim 3 that further includes:

creating an augmented reality overlay to be presented on a display of a consumer's mobile device in response to interaction between the mobile device and the product packaging label artwork;

storing augmentation data defining said augmented reality overlay, in association with said identifier;

in connection with capture of imagery of said product packaging label artwork by the consumer's mobile device, and decoding of the identifier from the steganographically encoded artwork element, (a) logging, in a database record, data associating the consumer or the consumer's mobile device with the product packaging label artwork, indicating the consumer has interacted with the product packaging label artwork; and (b) sending the stored augmentation data to the consumer's mobile device, for presentation of the augmented reality overlay.

12. The method of claim 11 that further includes, in connection with capture of imagery of the product packaging label artwork by a second consumer's mobile device, (a) logging, in a database record, data associating the second consumer or the second consumer's mobile device with the product packaging label artwork, indicating the second consumer has interacted with the product packaging label artwork; (b) determining, from previously-logged data, that the second consumer has previously interacted with different artwork, which steganographically encoded a different identifier; and (c) based on said determination, sending data to the second consumer's mobile device that is different than the stored augmentation data sent to the first consumer's mobile device.

13. The method of claim 3 in which the first layered element is added to the packaging label artwork by a user employing said graphical user interface, but the steganographic encoding of said first layered element with the received identifier is not performed until after the first layered element is added.

14. The method of claim 13 in which steganographic encoding of the first layered element is simulated by texturing that is displayed on a computer screen presented to the user to represent the label artwork.

15. The method of claim 13 in which the steganographic encoding of the first layered element is performed after authoring visual appearance of the first layered element has concluded.

16. The method of claim 3 in which said determining comprises determining by a modeling act based on user input specifying rendering circumstances.

17. A method for authoring product packaging label artwork having a network dimension, the method comprising the acts:
with a graphics editing program, creating artwork having a visual appearance desired by a user of the program, the artwork including first and second layered elements;
receiving a first plural-bit identifier;
with a processor-controlled hardware system, steganographically-encoding the first identifier in the first layered element of the product packaging label artwork la digital watermarking, but not in the second layered element;
determining, by a modeling act based on input specifying rendering circumstances, whether the product packaging label artwork is deficient in terms of recognizability of its steganographically-encoded first identifier;
following a determination that the artwork is deficient in terms of said recognizability, revising the steganographic encoding to enhance recognizability of its steganographically-encoded first identifier; and
sending the adjusted artwork to another party for printing.

18. The method of claim 17 that includes presenting results of said determining act in map form, indicating strength of the steganographically-encoded first identifier at different locations across the label artwork.

19. The method of claim 17 in which the determining act includes rendering the product packaging label artwork.

20. The method of claim 17 in which the determining act includes modeling the rendering of the product packaging label artwork.

21. The method of claim 17 in which the steganographic encoding comprises subtracting an encoding pattern from the first layered element.

22. The method of claim 17 in which the adjusting act comprises a software tool responding to said determining act by automatically adjusting the artwork to enhance recognizability of the steganographic encoding.

23. The method of claim 17 wherein the product packaging label artwork also includes a second product packaging label artwork element that conveys an identifier, wherein detection of the first product packaging label artwork element at a first region in the artwork by a consumer's mobile device leads to presentation of a first network response to the consumer, and detection of the second product packaging label artwork element at a second region in the artwork by the consumer's mobile device leads to presentation of a second, different, network response to the consumer.

24. The method of claim 23 in which the second identifier is different than the first identifier.

25. The method of claim 24 in which the second identifier is steganographically encoded in the artwork.

26. The method of claim 23 in which the second product packaging label artwork element comprises a 1D or 2D barcode.

27. The method of claim 17 that includes steganographically-encoding the label artwork with the first identifier, and with a second identifier, wherein the first and second identifiers are encoded at different scales.

28. The method of claim 27 in which the first and second identifiers are different.

29. The method of claim 17 in which the identifier is paired with associated information, and both the identifier and the associated information are pre-existing at a time that the user creates the artwork with the graphics editing program.

30. The method of claim 17 in which said determining comprises determining by a modeling act based on user input specifying rendering circumstances.

31. A non-transitory computer readable medium containing software instructions operable to configure a system, including a processor, to perform acts including:
providing a graphical user interface that includes authoring tools enabling a user to edit elements of product packaging label artwork, said layered elements including first and second layered elements;
receiving a first plural-bit identifier;
steganographically-encoding the first identifier in said first layered element by digital watermarking, but not in said second layered element;
determining, by a modeling act based on input specifying rendering circumstances, whether the product packaging label artwork is deficient in terms of recognizability of its steganographically-encoded first identifier; and
following a determination that the artwork is deficient in terms of said recognizability, revising the steganographic encoding to enhance recognizability of its steganographically-encoded first identifier.

32. The computer-readable medium of claim 31 in which said determining comprises determining by a modeling act based on user input specifying rendering circumstances.

33. A computer system comprising:
a processor;
a memory;
a display screen;
computer instructions stored in the memory that configure the system to perform acts including (a) providing a graphical user interface that includes authoring tools enabling a user to edit layered elements of product packaging label artwork, including first and second layered elements; and (b) receiving a first plural-bit identifier;
means for steganographically-encoding the first identifier in said first layered element by digital watermarking, but not in said second layered element;
said computer instructions further being adapted to perform acts including (c) determining, by a modeling act based on input specifying rendering circumstances, whether the product packaging label artwork is deficient in terms of recognizability of its steganographically-encoded first identifier; and (d) in response to a determination that the artwork is deficient in terms of said recognizability, revising the steganographic encoding to enhance recognizability of its steganographically-encoded first identifier.

34. The system of claim 33 in which said determining comprises determining by a modeling act based on user input specifying rendering circumstances.

* * * * *

UNITED STATES PATENT AND TRADEMARK OFFICE
CERTIFICATE OF CORRECTION

PATENT NO. : 10,356,274 B2  
APPLICATION NO. : 15/425573  
DATED : July 16, 2019  
INVENTOR(S) : Bruce L. Davis et al.

Page 1 of 1

It is certified that error appears in the above-identified patent and that said Letters Patent is hereby corrected as shown below:

On the Title Page

Column 2, Other Publications, Line 4, delete "om" and insert --in--.

Page 2, Column 2, Other Publications, Line 5, delete "2106" and insert --2016--.

In the Claims

Column 29, Claim 17, Line 35, delete "la" and insert --by--.

Column 30, Claim 32, Line 45, before "computer-readable" insert --non-transitory--.

Signed and Sealed this
Twenty-first Day of July, 2020

Andrei Iancu
*Director of the United States Patent and Trademark Office*